United States Patent
Tanaka

(10) Patent No.: US 12,380,022 B2
(45) Date of Patent: Aug. 5, 2025

(54) MEMORY SYSTEM

(71) Applicant: Kioxia Corporation, Tokyo (JP)

(72) Inventor: Ken Tanaka, Tokyo (JP)

(73) Assignee: Kioxia Corporation, Tokyo (JP)

( * ) Notice: Subject to any disclaimer, the term of this patent is extended or adjusted under 35 U.S.C. 154(b) by 68 days.

(21) Appl. No.: 18/529,470

(22) Filed: Dec. 5, 2023

(65) Prior Publication Data

US 2024/0202113 A1 Jun. 20, 2024

(30) Foreign Application Priority Data

Dec. 15, 2022 (JP) .................... 2022-200531

(51) Int. Cl.
G06F 12/00 (2006.01)
G06F 12/02 (2006.01)

(52) U.S. Cl.
CPC .. *G06F 12/0246* (2013.01); *G06F 2212/7201* (2013.01); *G06F 2212/7211* (2013.01)

(58) Field of Classification Search
CPC ......... G06F 12/0246; G06F 2212/7201; G06F 2212/7211; G06F 3/0616; G06F 3/064; G06F 3/065; G06F 3/0658; G06F 3/0679
USPC ....................................... 711/103
See application file for complete search history.

(56) References Cited

U.S. PATENT DOCUMENTS

| 7,224,604 | B2 | 5/2007 | Lasser |
| 9,703,495 | B2 | 7/2017 | Takubo et al. |
| 10,997,069 | B2 | 5/2021 | Lee |
| 2006/0106972 | A1* | 5/2006 | Gorobets ............ G06F 12/0246 711/E12.008 |
| 2010/0174845 | A1* | 7/2010 | Gorobets ............ G06F 12/0246 711/E12.001 |
| 2016/0011786 | A1* | 1/2016 | Ninose .................. G06F 3/0616 711/103 |

FOREIGN PATENT DOCUMENTS

| JP | 4790007 B2 | 10/2011 |
| JP | 2015-191294 A | 11/2015 |
| WO | WO-2006/097917 A2 | 9/2006 |

* cited by examiner

*Primary Examiner* — Mardochee Chery
(74) *Attorney, Agent, or Firm* — Foley & Lardner LLP

(57) ABSTRACT

According to one embodiment, a controller, in a case where a first difference between a first number of times of erase and a second number is equal to or smaller than a second threshold, executes a copy operation in a first mode, the second number of times of erase is larger than the first number of times of erase. In a case where the first difference is larger than the second difference, the controller executes the copy operation in a second mode. A ratio of a copy amount to a cumulative data write amount in a first mode is smaller than a ratio of the copy amount to the cumulative data write amount in the second mode. The cumulative data write amount is an amount of data written to the nonvolatile memory based on write commands.

12 Claims, 25 Drawing Sheets

| setting value | description |
|---|---|
| A | threshold value for determining whether or not to enable wear-leveling copy operation |
| A' | threshold value for determining whether or not to set wear-leveling copy operation to acceleration mode (A'>A) |
| B | threshold value of cumulative data write amount used in normal mode |
| B' | threshold value of cumulative data write amount used in acceleration mode (B'<B) |
| C | amount of data copied |

F I G. 4

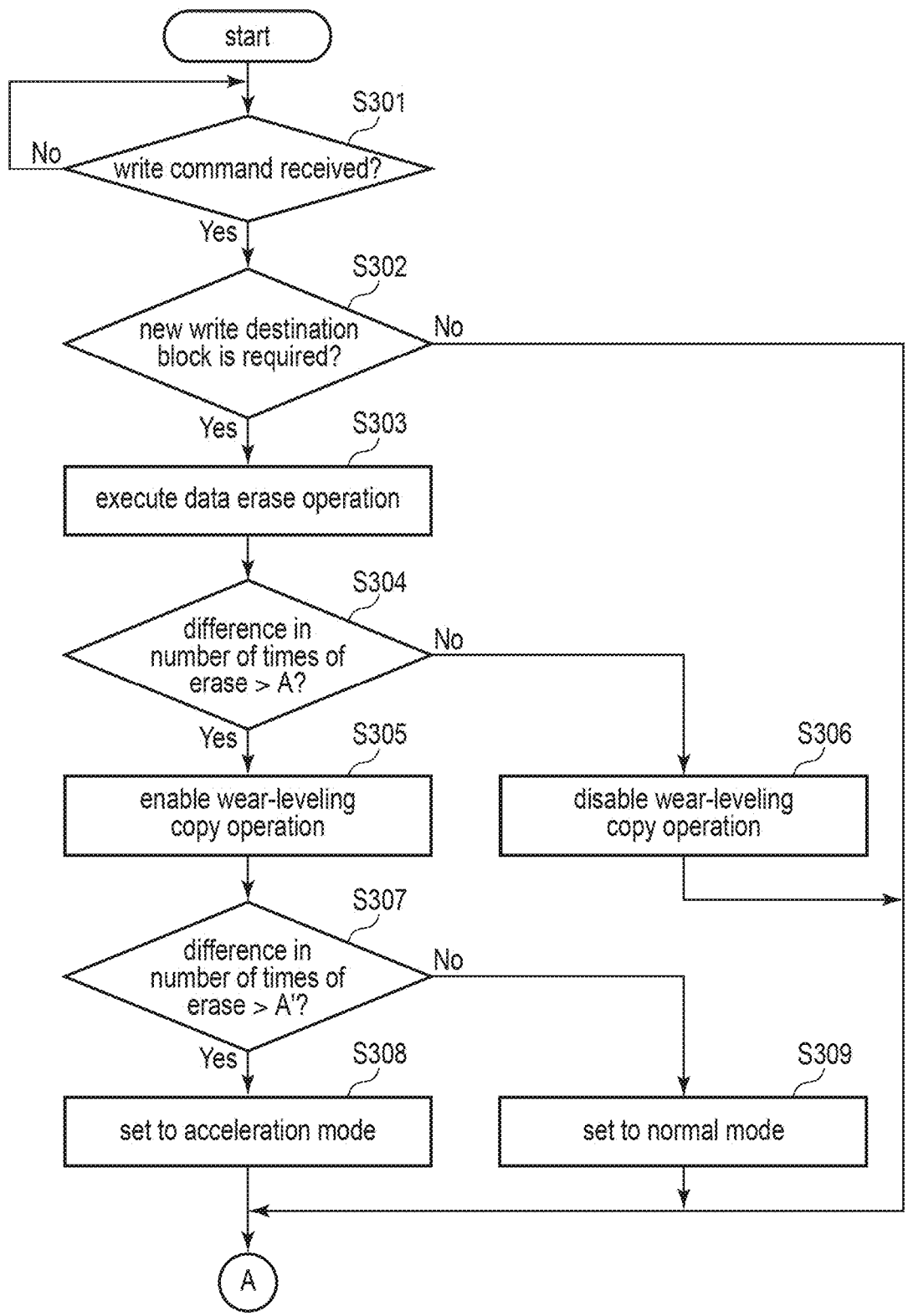
F I G. 9A

| setting value | description |
|---|---|
| A | threshold value for determining whether or not to enable wear-leveling copy operation |
| A' | threshold value for determining whether or not to set wear-leveling copy operation to acceleration mode (A'>A) |
| B | threshold value of cumulative data write amount used in normal mode and acceleration mode |
| C | amount of data copied by one copy operation in normal mode |
| C' | amount of data copied by one copy operation in acceleration mode (C'>C) |

F I G. 10

| setting value | description |
|---|---|
| A | threshold value for determining whether or not to enable wear-leveling copy operation |
| D | threshold value for determining whether or not to set wear-leveling copy operation to acceleration mode (setting value D is compared to difference between maximum number of times of erase and average of numbers of times of erase) |
| B | threshold value of cumulative data write amount used in normal mode |
| B' | threshold value of cumulative data write amount used in acceleration mode (B' <B) |
| C | amount of data copied |

F I G. 13

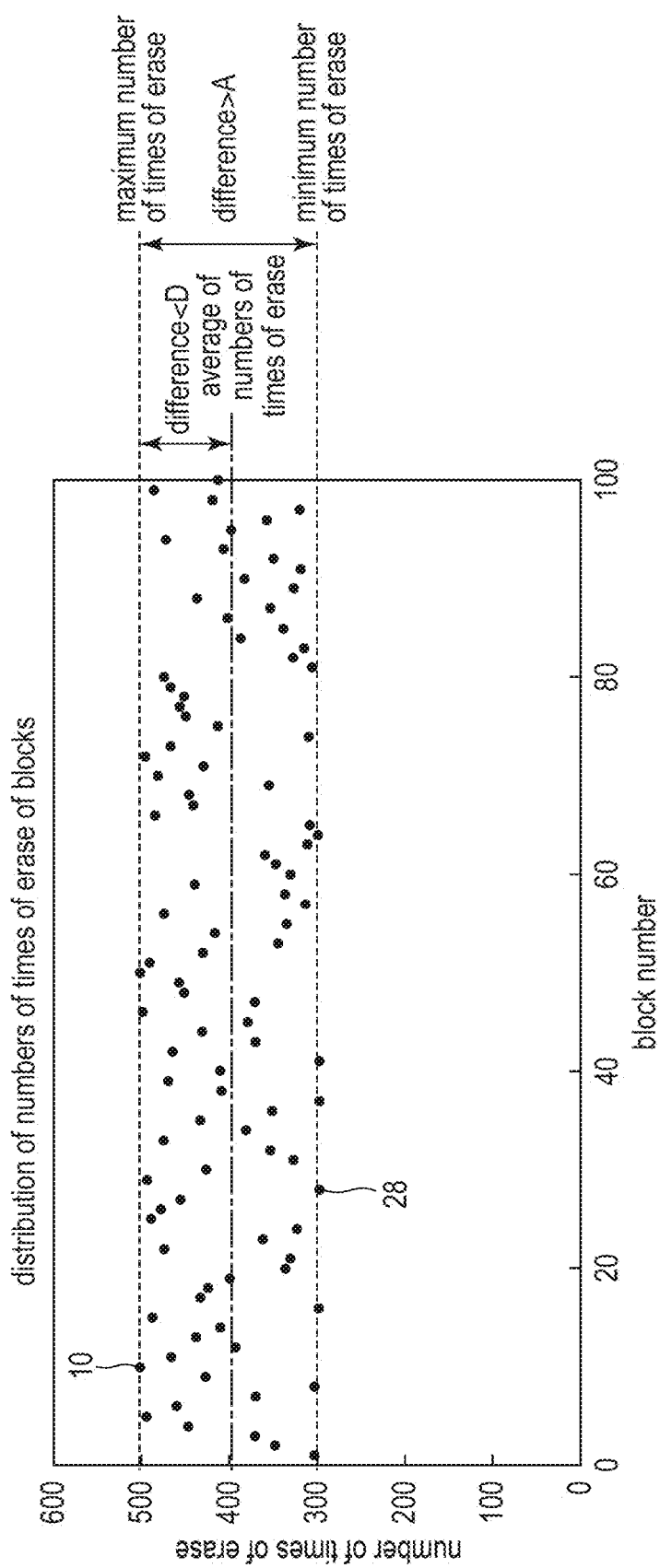
F I G. 14

| setting value | description |
|---|---|
| A | threshold value for determining whether or not to enable wear-leveling copy operation |
| D | threshold value for determining whether or not to set wear-leveling copy operation to acceleration mode (setting value D is compared to difference between maximum number of times of erase and average of numbers of times of erase) |
| B | threshold value of cumulative data write amount used in normal mode |
| C | amount of data copied |
| C' | amount of data copied (C'>C) |

F I G. 19

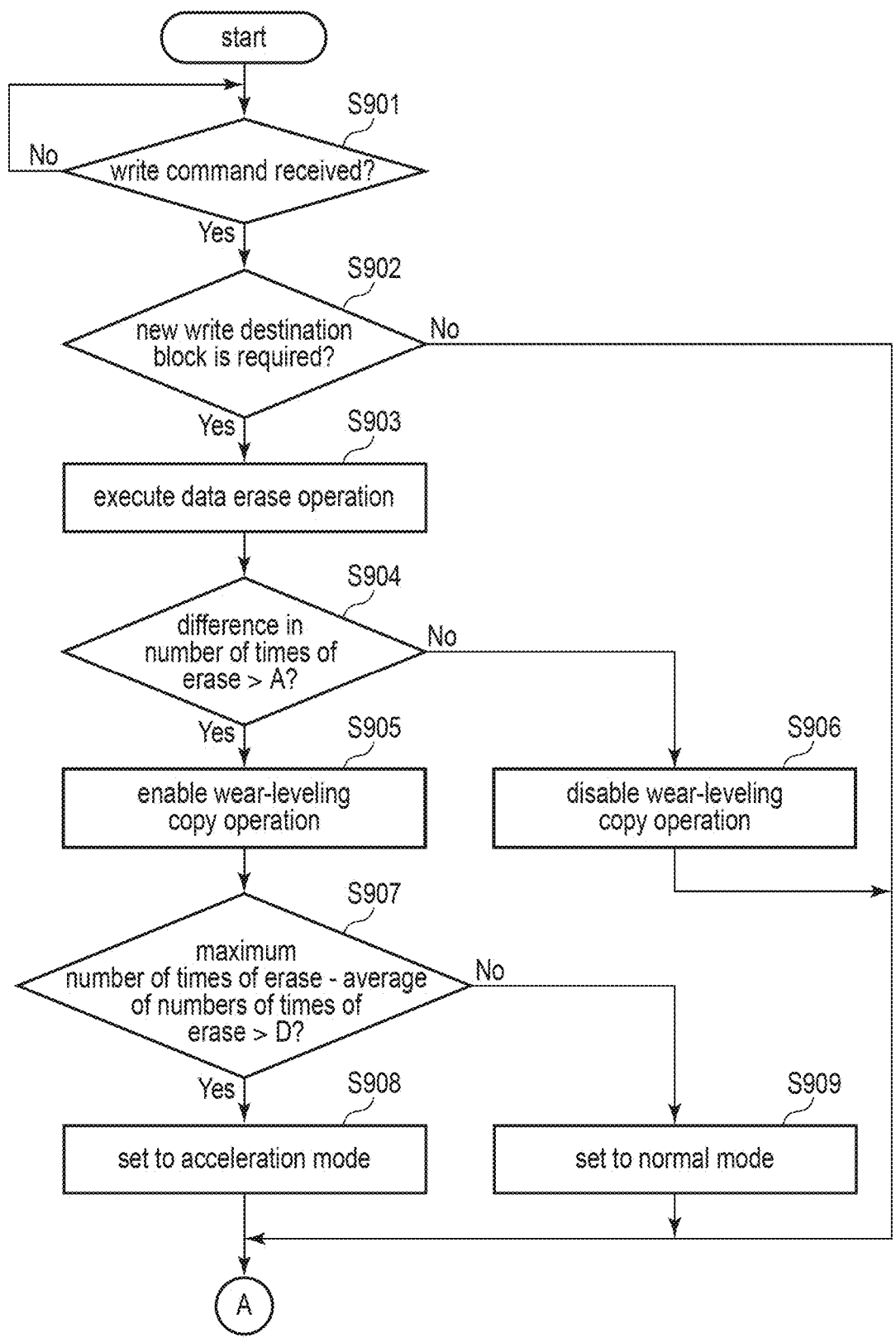
F I G. 21A

MEMORY SYSTEM

CROSS-REFERENCE TO RELATED APPLICATIONS

This application is based upon and claims the benefit of priority from Japanese Patent Application No. 2022-200531, filed Dec. 15, 2022, the entire contents of which are incorporated herein by reference.

FIELD

Embodiments described herein relate generally to a technique for controlling a nonvolatile memory.

BACKGROUND

In recent years, memory systems including nonvolatile memories are widely used. In the nonvolatile memory, a data write operation is executed in a unit of page. In contrast, a data erase operation is executed in a unit of block including a plurality of pages. In order not to excessively shorten a lifespan of the memory system, there is a need for a technology capable of dynamically controlling the amount of processing for leveling the numbers of times of erase of a plurality of blocks in the nonvolatile memory.

BRIEF DESCRIPTION OF THE DRAWINGS

FIG. 4 is a diagram illustrating setting values used in the wear-leveling copy operation executed in the memory system according to the first embodiment.

FIG. 9A is a flowchart illustrating a part of the procedure of the wear-leveling copy operation executed in the memory system according to the first embodiment.

FIG. 10 is a diagram illustrating setting values used in a wear-leveling copy operation executed in a memory system according to a second embodiment.

FIG. 13 is a diagram illustrating setting values used in a wear-leveling copy operation executed in a memory system according to a third embodiment.

FIG. 14 is a diagram illustrating a distribution of numbers of times of erase of blocks in a first case where the wear-leveling copy operation executed in the memory system according to the third embodiment is set to a normal mode.

FIG. 19 is a diagram illustrating setting values used in a wear-leveling copy operation executed in a memory system according to a fourth embodiment.

FIG. 21A is a flowchart illustrating a part of the procedure of the wear-leveling copy operation executed in the memory system according to the fourth embodiment.

DETAILED DESCRIPTION

In general, according to one embodiment, a memory system is connectable to a host. The memory system includes a nonvolatile memory and a controller. The nonvolatile memory includes a plurality of blocks, each of which is a unit of a data erase operation. The controller is electrically connected to the nonvolatile memory. At least a part of the plurality of blocks is able to store valid data. The controller executes a copy operation of copying valid data stored in a first block among blocks that store valid data to a second block which does not store valid data and has a larger number of times of erase than the first block. The controller compares a first threshold value with a first difference between a first number of times of erase and a second number of times of erase among numbers of times of erase of the plurality of respective blocks, the second number of times of erase being larger than the first number of times of erase. In a case where the first difference is larger than the first threshold value, the controller compares the first difference with a second threshold value which is larger than the first threshold value. In a case where the first difference is equal to or smaller than the second threshold value, the controller executes the copy operation in a first mode. In a case where the first difference is larger than the second threshold value, the controller executes the copy operation in a second mode. A ratio of a copy amount to a cumulative data write amount in the first mode is smaller than a ratio of the copy amount to the cumulative data write amount in the second mode. The cumulative data write amount is an amount of data written to the nonvolatile memory based on one or more write commands received from the host. The copy amount is an amount of data copied to the nonvolatile memory by the copy operation.

Various embodiments will be described hereinafter with reference to the accompanying drawings.

In the following explanation, it is assumed that a memory system according to each embodiment is realized as a solid-state drive (SSD). In addition, the memory system may be realized as a universal flash storage memory (UFS memory), and in this case, the SSD of the following embodiments is replaced with the UFS memory.

First Embodiment

Figure 1:
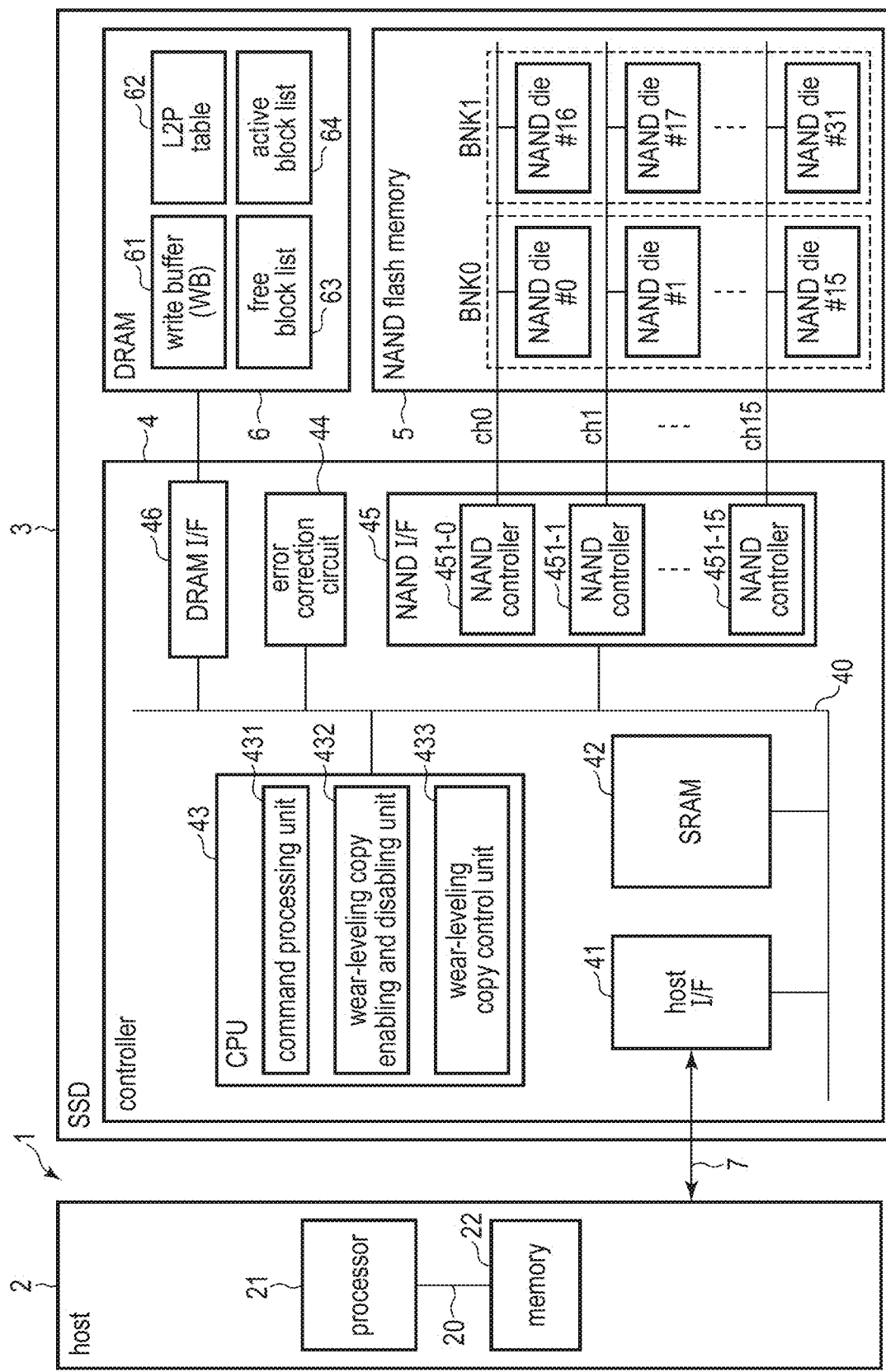
FIG. 1 is a block diagram illustrating an example of a configuration of an information processing system including a memory system according to a first embodiment.

FIG. 1 is a block diagram illustrating an example of a configuration of an information processing system 1 that includes a memory system according to a first embodiment. The information processing system 1 includes a host (host device) 2 and an SSD 3. The host 2 and the SSD 3 are connectable through a bus 7.

The host 2 is an information processing apparatus. The host 2 is, for example, a personal computer, a server computer, or a mobile terminal. The host 2 accesses the SSD 3. Specifically, the host 2 transmits, to the SSD 3, a write command which is a command to write data. In addition, the host 2 transmits, to the SSD 3, a read command which is a command to read data.

The SSD 3 is a storage device which is connectable to the host 2. The SSD 3 includes a nonvolatile memory. The SSD 3 writes data to the nonvolatile memory. In addition, the SSD 3 reads data from the nonvolatile memory.

Communication between the host 2 and the SSD 3 is executed through the bus 7. The bus 7 is, for example, a PCI express™ (PCIe™) bus. The host 2 transmits data and an input/output (I/O) command to the SSD 3 through the bus 7. In addition, the SSD 3 transmits data and a response to the host 2 through the bus 7. The I/O command is a command for writing data to the nonvolatile memory or reading data from the nonvolatile memory. The I/O command is, for example, a write command or a read command.

A logical interface for connecting the host 2 and SSD 3 conforms to standards such as NVM Express™ (NVMe™) or Serial Attached SCSI (SAS).

Next, a configuration of the host 2 will be described.

The host 2 includes a processor 21 and a memory 22. The processor 21 and the memory 22 are interconnected through an internal bus 20.

The processor 21 is, for example, a central processing unit (CPU). The processor 21 executes software (host software) loaded onto the memory 22. The host software is loaded onto the memory 22 from the SSD 3 or another storage device provided or connected to the host 2. The host software includes an operating system, a file system, a device driver, and an application program.

The memory 22 is, for example, a volatile memory. The memory 22 is also referred to as a main memory, a system memory, or a host memory. The memory 22 is, for example, a random access memory such as a dynamic random access memory (DRAM). A part of a storage area of the memory 22 is used as a data buffer. The data buffer stores write data to be written to the SSD 3 or read data transferred from the SSD 3.

Next, an internal configuration of the SSD 3 will be described. Hereinafter, it is assumed that the nonvolatile memory of the SSD 3 is realized as a NAND flash memory.

The SSD 3 includes a controller 4 and a NAND flash memory 5 (hereinafter, simply referred to as a NAND memory 5). In addition, the SSD 3 may further include a random access memory, for example, a dynamic random access memory (DRAM) 6.

The controller 4 is a memory controller. The controller 4 is, for example, a control circuit such as a system-on-a-chip (SoC). The controller 4 is electrically connected to the NAND memory 5. The controller 4 executes writing data to the NAND memory 5 and reading data from the NAND memory 5. For the physical interface which connects the controller 4 and the NAND memory 5, for example, a Toggle NAND flash interface or an open NAND flash interface (ONFI) is used. The function of each unit of the controller 4 may be realized by dedicated hardware, a processor which executes a program, or a combination thereof. In addition, the controller 4 is communicatively connected to the DRAM 6. The controller 4 executes writing data to the DRAM 6 and reading data from the DRAM 6. In addition, the controller 4 executes communication with the host 2 through the bus 7.

The NAND memory 5 is a nonvolatile memory. The NAND memory 5 is, for example, a flash memory having a two-dimensional structure or a flash memory having a three-dimensional structure. The NAND memory 5 includes, for example, a plurality of memory dies. The memory die is also referred to as a memory chip. Each of the plurality of memory dies is realized as a NAND flash memory die. Hereinafter, the memory die is referred to as a NAND die. In FIG. 1, a case where the NAND memory 5 includes 32 NAND dies #0 to #31 is illustrated as an example. Each of the NAND dies #0 to #31 includes a plurality of blocks. Each of the plurality of blocks is a minimum unit of a data erase operation. The data erase operation is an operation of erasing data stored in the NAND memory 5.

The DRAM 6 is a volatile memory. The DRAM 6 includes, for example, a storage area used as a write buffer (WB) 61, a storage area for storing a logical-to-physical address translation table (L2P table) 62, a storage area for storing a free block list 63, and a storage area for storing an active block list 64. The WB 61 is a storage area that temporarily stores write data received from the host 2. The L2P table 62 is a table that stores mapping information. The mapping information is information indicating mapping between each logical address and each physical address of the NAND memory 5 in a unit of a predetermined management size. The logical address is an address used by the host 2 to access the SSD 3. For example, a logical block address (LBA) is used as the logical address. The physical address is an address indicating a storage location in the NAND memory 5. The free block list 63 is a list for managing free blocks. The free block is a block that does not store valid data, and data stored in the free block is only invalid data. The valid data is data stored in a storage area indicated by a physical address which is mapped to a logical address. The invalid data is data stored in a storage area indicated by a physical address which is not mapped to a logical address. That is, the invalid data is data not to be read by the host 2 anymore. The active block list 64 is a list that manages active blocks. The active block is a block that stores at least valid data.

Next, an internal configuration of the controller 4 will be described. The controller 4 includes, for example, a host interface circuit (host I/F) 41, a static RAM (SRAM) 42, a CPU 43, an error correction circuit 44, a NAND interface circuit (NAND I/F) 45, and a DRAM interface circuit (DRAM I/F) 46. The host interface circuit 41, the SRAM 42, the CPU 43, the error correction circuit 44, the NAND interface circuit 45, and the DRAM interface circuit 46 are interconnected through an internal bus 40.

The host interface circuit 41 is a hardware interface circuit. The host interface circuit 41 executes communication with the host 2.

The SRAM 42 is a volatile memory. A storage area of the SRAM 42 is used as a work area of the CPU 43. The SRAM 42 includes, for example, a storage area that stores information indicating the numbers of times of erase of a plurality of respective blocks, and a storage area that stores setting values used for a copy operation for leveling the numbers of times of erase of the plurality of blocks included in the NAND memory 5. Hereinafter, the copy operation for leveling the numbers of times of erase is referred to as a wear leveling copy operation.

The CPU 43 is a processor. The CPU 43 controls the host interface circuit 41, the SRAM 42, the error correction circuit 44, the NAND interface circuit 45, and the DRAM interface circuit 46. The CPU 43 loads control programs (firmware) from a ROM (not illustrated) or the NAND memory 5 onto the SPAM 42. The CPU 43 performs various processes by executing the control programs (firmware). Note that, the firmware may be loaded onto the DRAM 6.

For example, the CPU 43 performs, as a flash translation layer (FTL), management of data stored in the NAND memory 5 and management of blocks included in the NAND memory 5. The management of data stored in the NAND memory 5 includes, for example, management of mapping information indicating relationships between each logical address and each physical address of the NAND memory 5. The CPU 43 manages the mapping information by using the L2P table 62. In addition, the management of blocks included in the NAND memory 5 includes, for example, wear leveling, garbage collection, and management of defective blocks (bad blocks) included in the NAND memory 5.

The wear leveling is a process of leveling the numbers of times of erase of the blocks included in the NAND memory 5. In the wear leveling, the numbers of data erase operations executed on the respective blocks included in the NAND memory 5 are monitored, and the numbers of data erase operations on the blocks are leveled. Thus, as a data write destination block, a block having a smaller number of data erase operations is preferentially selected among the free blocks. The number of data erase operations executed on a block is also referred to as the number of program/erase cycles (P/E cycles). Hereinafter, the number of data erase operations executed on a block is simply referred to as the number of times of erase. Specifically, the cumulative number of data erase operations executed on each block from a certain point in time may be used as the number of times of erase. The certain point in time is, for example, at the time of factory shipment.

The error correction circuit 44 executes encoding processing when data is to be written to the NAND memory 5. In the encoding processing, the error correction circuit 44 adds, as a redundancy code, an error correction code (ECC) to the data to be written to the NAND memory 5. When data has been read from the NAND memory 5, the error correction circuit 44 executes decoding processing. In the decoding processing, the error correction circuit 44 executes error correction of the data by using an ECC added to the data read from the NAND memory 5.

The NAND interface circuit 45 is a circuit that controls the NAND memory 5. The NAND interface circuit 45 is electrically connected to the plurality of NAND dies included in the NAND memory 5.

The individual NAND dies are independently operable. Thus, each of the NAND dies functions as a unit operable in parallel. The NAND interface circuit 45 includes, for example, NAND controllers 451-0, 451-1, . . . , and 451-15. The NAND controllers 451-0, 451-1, . . . , and 451-15 are connected to channels ch0, ch1, . . . , and ch15, respectively. Each of the NAND controllers 451-0, 451-1, . . . , 451-15 is connected to one or more NAND dies through the corresponding channel. FIG. 1 illustrates a case where two NAND dies are connected to each of the channels ch0, ch1, . . . , and ch15. In this case, the NAND controller 451-0 is connected to the NAND dies #0 and #16 through the channel ch0.

The NAND controller 451-1 is connected to the NAND dies #1 and #17 through the channel ch1. The NAND controller 451-15 is connected to the NAND dies #15 and #31 through the channel ch15. The NAND dies #0, #1, . . . , and #15 are managed as a bank BNK0 by the controller 4. Similarly, the NAND dies #16, #17, . . . , and #31 are managed as a bank BNK1 by the controller 4. Each bank is a unit in which the plurality of NAND dies are operated in parallel by an interleaving operation.

In a configuration of the NAND memory 5 illustrated in FIG. 1, the controller 4 can access the NAND dies #0 to #31 in parallel by a bank interleave operation with the 16 channels. Thus, the controller 4 can execute writing or reading data to or from a maximum of 32 NAND dies in parallel (the number of parallel accesses=32). Note that, each of the NAND dies #0 to #31 may have a multi-plane configuration, that is, include a plurality of planes. For example, in a case where each of the NAND dies #0 to #31 includes two planes, the controller 4 can execute writing or reading data to or from a maximum of 64 planes in parallel (the number of parallel accesses=64).

The DRAM interface circuit 46 is a circuit that controls the DRAM 6. The DRAM interface circuit 46 stores data in the DRAM 6. In addition, the DRAM interface circuit 46 reads data stored in the DRAM 6.

Next, a functional configuration of the CPU 43 will be described. The CPU 43 includes, in addition to the components functioning as the FTL, a command processing unit 431, a wear-leveling copy enabling and disabling unit 432, and a wear-leveling copy control unit 433. A part or all of the command processing unit 431, the wear-leveling copy enabling and disabling unit 432, and the wear-leveling copy control unit 433 may be realized by dedicated hardware of the controller 4.

The command processing unit 431 executes a read process by processing each read command received from the host 2. The read process includes, for example, a process of converting a logical address specified by the read command into a physical address by referring to the L2P table 62, a process of reading data from a storage location in the NAND memory 5 identified by the physical address, and a process of transferring the read data to the memory 22 of the host 2.

The command processing unit 431 executes a write process by processing each write command received from the host 2. The write process includes, for example, a process of acquiring write data associated with a write command from the memory 22 of the host 2, a process of writing the write data into a storage location in the NAND memory 5, and a process of updating the L2P table 62 in order to map a physical address indicating the storage location where the write data has been written to a logical address specified by the write command. The command processing unit 431 manages a cumulative value indicating the amount of data written to the NAND memory 5, based on the write command received from the host 2.

When data has been written to the NAND memory 5, the command processing unit 431 updates the cumulative value indicating the amount of data written to the NAND memory 5. Hereinafter, the cumulative value is referred to as a cumulative data write amount. The cumulative data write amount is the amount of data written to the NAND memory 5 based on the write commands received from the host 2. When data has been written to the NAND memory 5, the command processing unit 431 adds the amount of data written to the NAND memory 5 to the cumulative data write amount to update the cumulative data write amount. When the wear-leveling copy operation has been executed, the cumulative data write amount is reset to an initial value (for example, 0).

In the wear-leveling copy operation, valid data stored in a block (also referred to as a first block) having the smallest number of times of erase among blocks that store valid data is copied to a block (also referred to as a second block) having a larger number of times of erase than the first block among blocks (free blocks) that do not store valid data. Here, as the second block, for example, a block having the second largest number of times of erase may be selected from the free blocks.

The wear-leveling copy enabling and disabling unit 432 enables or disables the wear-leveling copy operation. In response to the data erase operation on a block allocated as a new write destination block being executed, the wear-leveling copy enabling and disabling unit 432 checks the number of times of erase of each block. The wear-leveling copy enabling and disabling unit 432 compares, with a first threshold value, a difference (also referred to as a first difference) between a maximum number of times of erase and a minimum number of times of erase among the numbers of times of erase of all blocks to which data can be written and which are included in the NAND memory 5. All the blocks to which data can be written include blocks in the free block list 63 and blocks in the active block list 62. The first threshold value may be set in advance as, for example, a setting value A. In a case where the first difference is larger than the setting value A, the wear-leveling copy enabling and disabling unit 432 enables the wear-leveling copy operation. In addition, in a case where the first difference is equal to or smaller than the setting value A, the wear-leveling copy enabling and disabling unit 432 disables the wear-leveling copy operation.

The wear-leveling copy control unit 433 controls the wear-leveling copy operation. The wear-leveling copy control unit 433 compares the first difference with a second threshold value in response to the wear-leveling copy operation being enabled. The second threshold value is a value larger than the first threshold value. The second threshold value may be set in advance, for example, as a setting value A' (>A). In a case where the first difference is equal to or smaller than the setting value A', the wear-leveling copy control unit 433 sets the wear-leveling copy operation to a normal mode. The normal mode is also referred to as a first mode. In a case where the first difference is larger than the setting value A', the wear-leveling copy control unit 433 sets the wear-leveling copy operation to an acceleration mode. The acceleration mode is also referred to as a second mode.

In a case where the wear-leveling copy operation is in the normal mode, the wear-leveling copy control unit 433 executes the wear-leveling copy operation. At this time, the wear-leveling copy control unit 433 sets a ratio of (i) the amount of data copied to the NAND memory 5 by the wear-leveling copy operation to (ii) the amount of data written to the NAND memory 5 by write processes to a first ratio. The amount of data written to the NAND memory 5 by the write processes is the amount of data written to the NAND memory 5 based on a plurality of write commands received from the host 2, that is, the amount of host write. For example, in the normal mode, in a case where the cumulative data write amount exceeds a third threshold value, the wear-leveling copy control unit 433 copies a first amount of valid data by executing the wear-leveling copy operation. That is, in a case where the cumulative data write amount exceeds the third threshold value, the wear-leveling copy control unit 433 executes the wear-leveling copy operation such that the valid data stored in the first block is copied to the second block by the first amount.

The third threshold value may be set in advance as, for example, a setting value B. The first amount may be set in advance, for example, as a setting value C. Note that, in a case where the amount of valid data stored in the first block is smaller than the first amount, after the valid data stored in the first block is copied to the second block, a block having the smallest number of times of erase may be selected again as a new first block from among blocks that store valid data.

In a case where the wear-leveling copy operation is in the acceleration mode, the wear-leveling copy control unit 433 executes the wear-leveling copy operation. At this time, the wear-leveling copy control unit 433 sets a ratio of (i) the amount of data copied to the NAND memory 5 by the wear-leveling copy operation to (ii) the amount of data written to the NAND memory 5 by write processes to a second ratio. The second ratio is a value larger than the first ratio in the normal mode. For example, in the acceleration mode, in a case where the cumulative data write amount exceeds a fourth threshold value, the wear-leveling copy control unit 433 copies the first amount of valid data by executing the wear-leveling copy operation. That is, in a case where the cumulative data write amount exceeds the fourth threshold value, the wear-leveling copy control unit 433 executes the wear-leveling copy operation such that the valid data stored in the first block is copied to the second block by the first amount.

The fourth threshold value is a value smaller than the third threshold value. The fourth threshold value may be set in advance, for example, as a setting value B' (<B). This causes, in the acceleration mode, the wear-leveling copy operation to be executed whenever a smaller amount of host write is performed than in the normal mode. In other words, in the acceleration mode, the wear-leveling copy operation is executed more frequently than in the normal mode.

Figure 2:
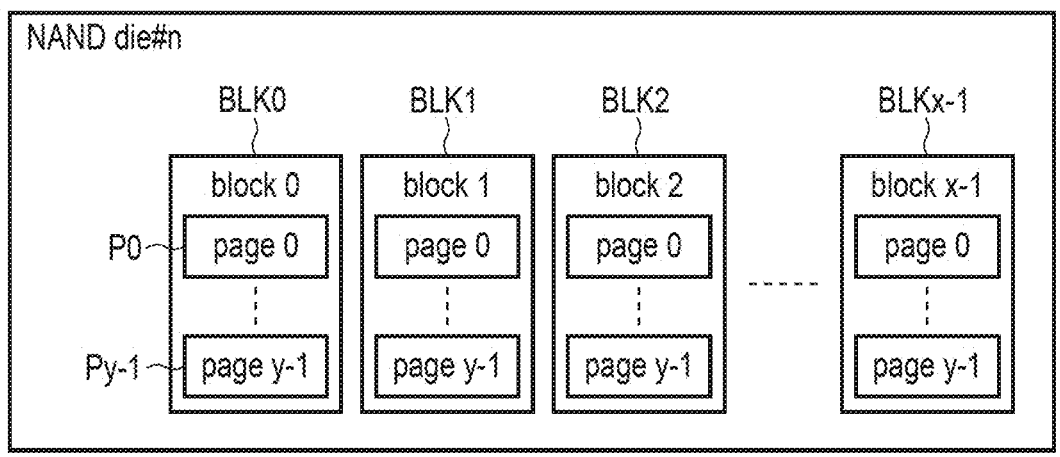
FIG. 2 is a block diagram illustrating an example of a configuration of each of a plurality of memory dies included in a nonvolatile memory of the memory system according to the first embodiment.

Next, a configuration of the NAND die will be described. FIG. 2 is a block diagram illustrating an example of a configuration of each of the plurality of NAND dies included in the NAND flash memory 5.

A NAND die #n is any NAND die among the NAND dies #0 to #31. The NAND die #n includes a plurality of blocks BLK0 to BLKx-1. Each of the blocks BLK0 to BLKx-1 includes a plurality of pages (here, pages P0 to Py-1). Each page includes a plurality of memory cells. Each of the blocks BLK0 to BLKx-1 is a unit of a data erase operation for erasing data. Each of the pages P0 to Py-1 is a unit of a data write operation and a data read operation.

Figure 3:
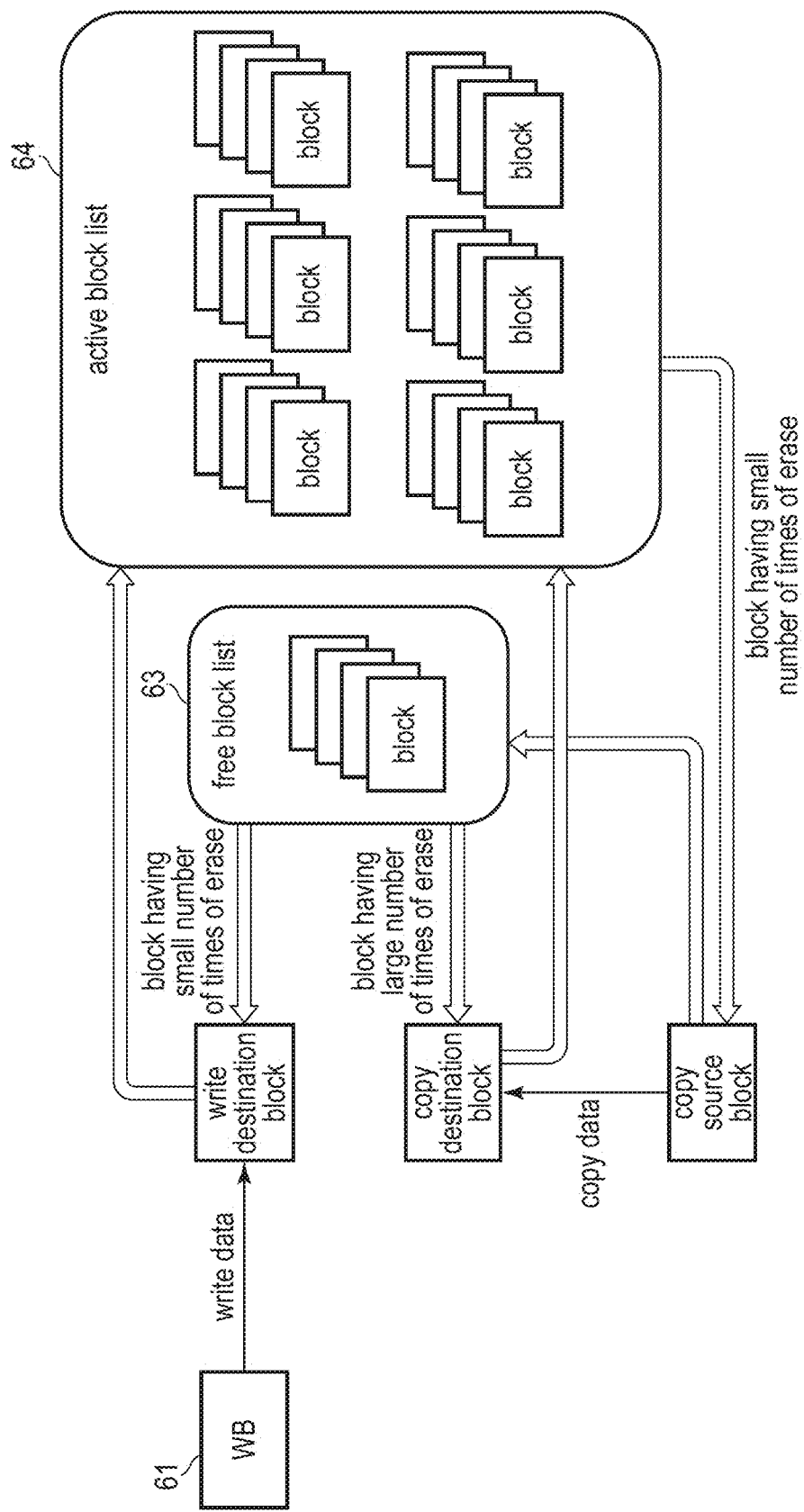
FIG. 3 is a diagram illustrating an example of a wear-leveling copy operation executed in the memory system according to the first embodiment.

Next, the wear-leveling copy operation will be described. FIG. 3 is a diagram illustrating an example of the wear-leveling copy operation executed in the memory system according to the first embodiment.

First, the controller 4 writes data stored in the write buffer (WB) 61 to a write destination block in response to a write command. The controller 4 stores, in the L2P table 62, mapping information indicating a correspondence between a logical address specified by the write command and a physical address indicating a storage location in the write destination block. In a case where old data corresponding to the logical address has already been stored in another active block, a physical address indicating a storage location where the old data is stored loses the correspondence with the logical address. That is, the old data becomes invalid data. Such a write operation is also referred to as data overwriting.

The controller 4 selects a block to be allocated as a new write destination block from the free blocks. At this time, the controller 4 preferentially selects, as the new write destination block, a block having a small number of times of erase from among the blocks registered in the free block list 63. For example, the controller 4 selects a block having the smallest number of times of erase from the free blocks. The controller 4 executes the data erase operation on the selected block. As a result, the selected block becomes a block to which data can be written. The controller 4 allocates the block from which data has been erased to the write destination block and registers the block in the active block list 64. At this time, in response to the data erase operation being executed, the controller 4 checks the number of times of erase of each of the plurality of blocks, and executes process of determining whether to enable or disable the wear-leveling copy operation.

In addition, when the write destination block has had no storage area to which new data can be written, the controller 4 deallocates the block from the write destination block. The deallocated block is simply a block managed as an active block.

When a data write process is completed, the controller 4 determines whether or not the wear-leveling copy operation is enabled. In a case where the wear-leveling copy operation is enabled, the controller 4 executes the wear-leveling copy operation of copying valid data of the amount of the setting value C stored in a copy source block to a copy destination block. Here, in a case where a total size of valid data stored in the copy source block is smaller than the setting value C, the controller 4 selects an additional copy source block from the active blocks. Alternatively, during the execution of the wear-leveling copy operation, the controller 4 may select an additional copy source block from the active blocks in response to all the valid data stored in the copy source block being copied. At this time, the controller 4 selects, for example, a block having the smallest number of times of erase from the active blocks registered in the active block list 64.

In the wear-leveling copy operation, the controller 4 may copy all the data stored in the copy source block to the copy destination block, instead of copying the valid data stored in the copy source block to the copy destination block. When the copy source block has become a block that does not store valid data as the wear-leveling copy operation progresses, the copy source block is registered in the free block list 63. This causes a block having a small number of times of erase to become a free block that can be newly allocated to the write destination block.

In addition, when the copy destination block has had no storage area to which new data can be stored, the controller 4 selects a block having a large number of times of erase from the blocks registered in the free block list 63 and allocates the selected block to the copy destination block. At this time, the controller 4 selects a free block having a larger number of times of erase than at least the number of times of erase of the block selected as the copy source block, and allocates the selected free block to the copy destination block. For example, the controller 4 selects a block having the second largest number of times of erase from the free blocks registered in the free block list 63 and allocates the selected block to the copy destination block.

Data stored in an active block having a small number of times of erase is expected to be data having a low update frequency. Thus, data expected to have a low update frequency is copied to a block having a large number of times of erase, and thus, suppression of a further increase in the number of times of erase of this block can be expected.

Next, the setting values used in the wear-leveling copy operation will be described. FIG. 4 is a diagram illustrating the setting values used in the wear-leveling copy operation executed in the memory system according to the first embodiment.

Each setting value may be set in advance at the time of manufacturing the SSD 3 or may be updated while the SSD 3 operates.

First, the setting value A is a threshold value for determining whether or not to enable the wear-leveling copy operation. The setting value A is compared with a difference between the maximum number of times of erase and the minimum number of times of erase among the numbers of times of erase of the blocks. When checking the numbers of times of erase of the plurality of respective blocks, the controller 4 compares the difference between the maximum number of times of erase and the minimum number of times of erase (also referred to as a difference in the number of times of erase) with the setting value A. In a case where the difference in the number of times of erase is larger than the setting value A, the controller 4 enables the wear-leveling copy operation. In a case where the difference in the number of times of erase is equal to or smaller than the setting value A, the controller 4 disables the wear-leveling copy operation. That is, in a case where the setting value A is set to a large value, the difference between the maximum number of times of erase and the minimum number of times of erase is allowed to be relatively large. On the other hand, in a case where the setting value A is set to a small value, the wear-leveling copy operation is enabled such that the difference between the maximum number of times of erase and the minimum number of times of erase becomes relatively small.

The setting value A' is a threshold value for determining whether or not to set the wear-leveling copy operation to the acceleration mode. The setting value A' is a value larger than the setting value A. In a case where the wear-leveling copy operation is enabled, the controller 4 compares the difference between the maximum number of times of erase and the minimum number of times of erase with the setting value A'. In a case where the difference in the number of times of erase is equal to or smaller than the setting value A', the controller 4 sets the wear-leveling copy operation to the normal mode. In a case where the difference in the number of times of erase is larger than the setting value A', the controller 4 sets the wear-leveling copy operation to the acceleration mode.

The setting value B is a threshold value of the cumulative data write amount and is used in the normal mode. In a case where the wear-leveling copy operation is in the normal mode, the controller 4 compares the cumulative data write amount with the setting value B in response to the cumulative data write amount being updated. In a case where the cumulative data write amount exceeds the setting value B, the controller 4 executes the wear-leveling copy operation. In a case where the cumulative data write amount is equal to or smaller than the setting value B, the controller 4 does not execute the wear-leveling copy operation. That is, the setting value B relates to a frequency at which the wear-leveling copy operation is executed. In a case where the setting value B is set to a small value, the controller 4 executes the wear-leveling copy operation at a relatively high frequency. In contrast, in a case where the setting value B is set to a large value, the controller 4 executes the wear-leveling copy operation at a relatively low frequency.

The setting value B' is a threshold value of the cumulative data write amount and is used in the acceleration mode. The setting value B' is a value smaller than the setting value B. In a case where the wear-leveling copy operation is in the acceleration mode, the controller 4 compares the cumulative data write amount with the setting value B' in response to the cumulative data write amount being updated. In a case where the cumulative data write amount exceeds the setting value B', the controller 4 executes the wear-leveling copy operation. In a case where the cumulative data write amount is equal to or smaller than the setting value B', the controller 4 does not execute the wear-leveling copy operation. Since the setting value B' is a value smaller than the setting value B, in a case where the wear-leveling copy operation is in the acceleration mode, the controller 4 executes the wear-leveling copy operation more frequently than the wear-leveling copy operation in the normal mode.

The setting value C is the amount of data copied from the copy source block to the copy destination block in one wear-leveling copy operation. The controller 4 copies data of the amount of the setting value C from the copy source block to the copy destination block when the wear-leveling copy operation is executed. The setting value C is, for example, 1/100 of the size of one block. In a case where the setting value C is set to a small value, since a time required for one wear-leveling copy operation is short, the latency of the write process caused by the wear-leveling copy operation is relatively small. In contrast, in a case where the setting value C is set to a large value, the time required for one wear-leveling copy operation becomes long, but an ability to level the numbers of times of erase of a plurality of blocks by one wear-leveling copy operation will be relatively large.

Figure 5:
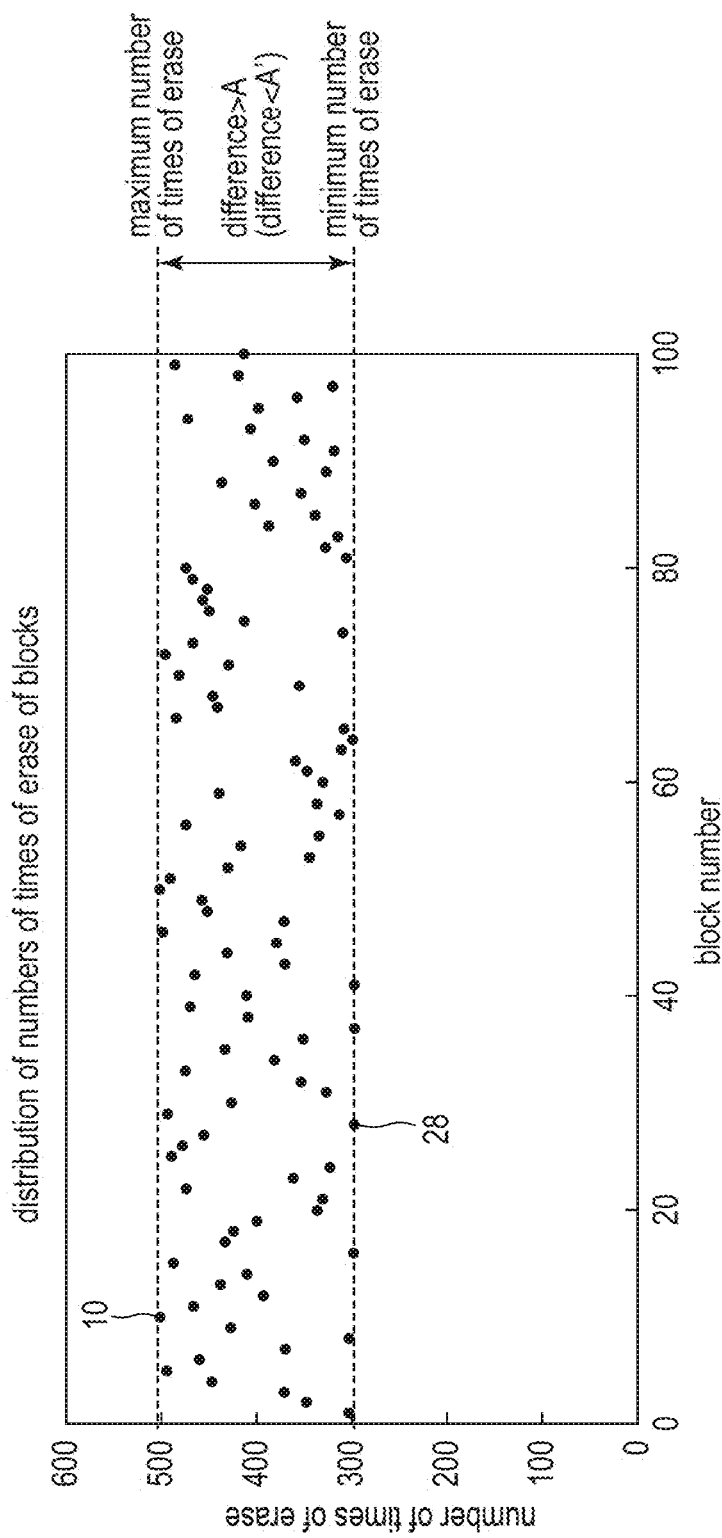
FIG. 5 is a diagram illustrating a distribution of numbers of times of erase of blocks in a case where the wear-leveling copy operation executed in the memory system according to the first embodiment is set to a normal mode.

Next, a distribution of the numbers of times of erase of blocks in a case where the wear-leveling copy operation is set to the normal mode will be described. FIG. 5 is a diagram illustrating the distribution of the numbers of times of erase of blocks in a case where the wear-leveling copy operation executed in the memory system according to the first embodiment is set to the normal mode.

A vertical axis represents the number of times of erase of a block. A horizontal axis indicates a block number of a block. In FIG. 5, the number of times of erase of each of 100 blocks that have block numbers 1 to 100, respectively, is plotted.

Here, it is assumed that the setting value A is set to 200 and the setting value A' is set to 400.

A block having the maximum number of times of erase among the numbers of times of erase of the plurality of respective blocks is a block having a block number 10 (hereinafter, referred to as a block 10). The number of times of erase of the block 10 is 502 times.

On the other hand, a block having the minimum number of times of erase among the numbers of times of erase of the plurality of respective blocks is a block having a block number 28 (hereinafter, referred to as a block 28). The number of times of erase of the block 28 is 298 times.

It is assumed that checking the numbers of times of erase of the blocks is executed on the distribution of the numbers of times of erase illustrated in FIG. 5.

First, the controller 4 determines whether or not to enable the wear-leveling copy operation by comparing the difference between the maximum number of times of erase and the minimum number of times of erase with the setting value A. The difference between the maximum number of times of erase and the minimum number of times of erase is a difference between the number of times of erase of the block 10 and the number of times of erase of the block 28. That is, the difference in the number of times of erase is 502−298=204. When the difference in the number of times of erase is compared with the setting value A, since the difference in the number of times of erase is larger than the setting value A (204>200), the controller 4 enables the wear-leveling copy operation.

Subsequently, the controller 4 determines whether to set the wear-leveling copy operation to the normal mode or the acceleration mode by comparing the difference in the number of times of erase with the setting value A'. When the difference in the number of times of erase is compared with the setting value A', since the difference in the number of times of erase is equal to or smaller than the setting value A' (204<400), the controller 4 sets the wear-leveling copy operation to the normal mode.

Figure 6:
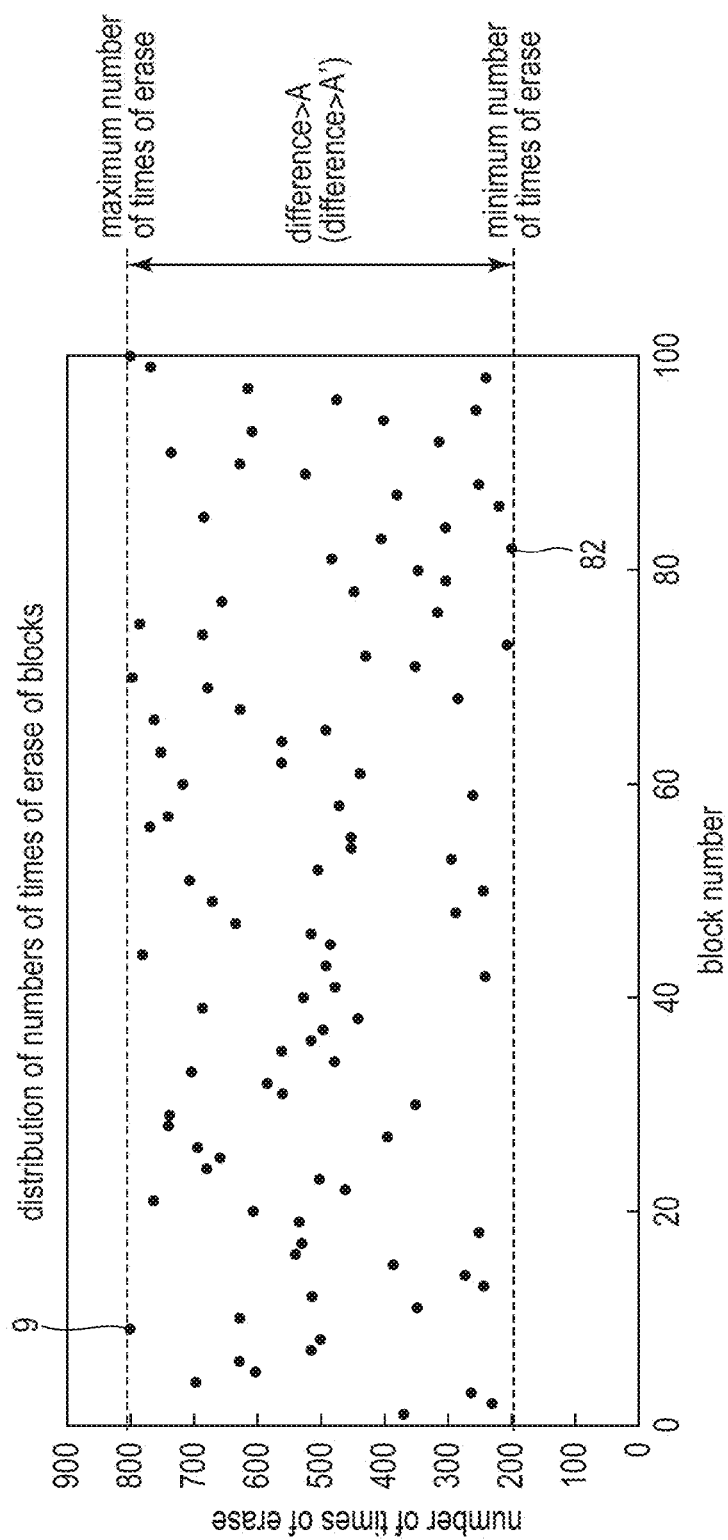
FIG. 6 is a diagram illustrating a distribution of numbers of times of erase of blocks in a case where the wear-leveling copy operation executed in the memory system according to the first embodiment is set to an acceleration mode.

Next, a distribution of the numbers of times of erase of blocks in a case where the wear-leveling copy operation is set to the acceleration mode will be described. FIG. 6 is a diagram illustrating a distribution of the numbers of times of erase of blocks in a case where the wear-leveling copy operation executed in the memory system according to the first embodiment is set to the acceleration mode.

A vertical axis represents the number of times of erase of a block. A horizontal axis indicates a block number of a block. In FIG. 6, the number of times of erase of each of 100 blocks that have block numbers 1 to 100, respectively, is plotted.

Here, it is assumed that the setting value A is set to 200 and the setting value A' is set to 400.

A block having the maximum number of times of erase among the numbers of times of erase of the plurality of respective blocks is a block having a block number 9 (hereinafter, referred to as a block 9). The number of times of erase of the block 9 is 802 times.

On the other hand, a block having the minimum number of times of erase among the numbers of times of erase of the plurality of respective blocks is a block having a block number 82 (hereinafter, referred to as a block 82). The number of times of erase of the block 82 is 201 times.

It is assumed that checking the numbers of times of erase of the blocks is executed on the distribution of the numbers of times of erase illustrated in FIG. 6.

First, the controller 4 determines whether or not to enable the wear-leveling copy operation by comparing a difference between the maximum number of times of erase and the minimum number of times of erase with the setting value A. The difference between the maximum number of times of erase and the minimum number of times of erase is a difference between the number of times of erase of the block 9 and the number of times of erase of the block 82. Thus, the difference in the number of times of erase is 802−201=601. When the difference in the number of times of erase is compared with the setting value A, since the difference in the number of times of erase is larger than the setting value A (601>200), the controller 4 enables the wear-leveling copy operation.

Subsequently, the controller 4 determines whether to set the wear-leveling copy operation to the normal mode or the acceleration mode by comparing the difference in the number of times of erase with the setting value A'. When the difference in the number of times of erase is compared with the setting value A', since the difference in the number of times of erase is larger than the setting value A' (601>400), the controller 4 sets the wear-leveling copy operation to the acceleration mode.

Figure 7:
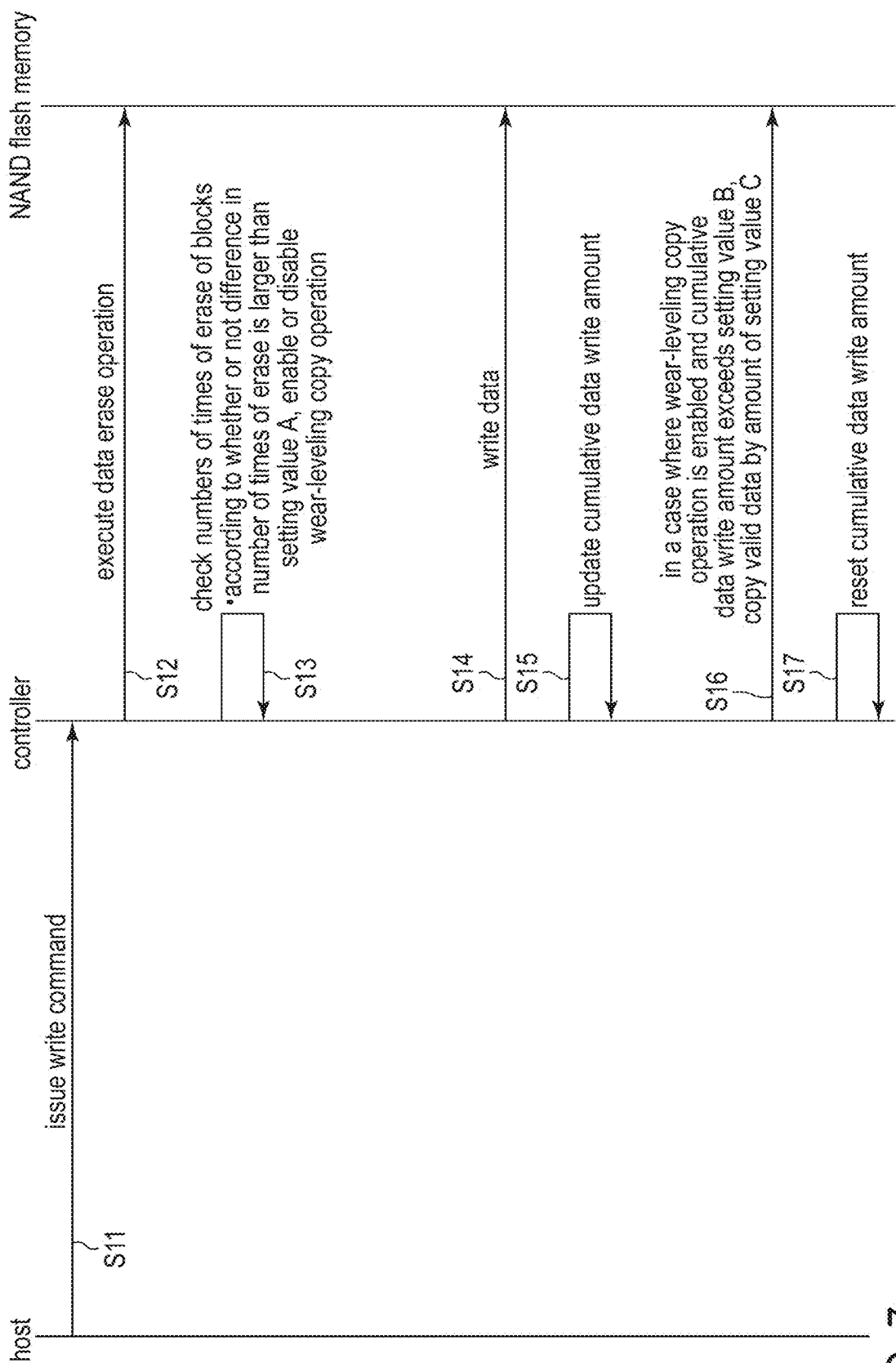
FIG. 7 is a sequence diagram illustrating the procedure of a wear-leveling copy operation executed in a memory system according to a comparative example.

Next, a procedure of a wear-leveling copy operation in a case where the acceleration mode is not used will be described. FIG. 7 is a sequence diagram illustrating a procedure of a wear-leveling copy operation executed in a memory system according to a comparative example.

First, a host issues a write command to a controller of the memory system (step S11). In S11, the host transmits data along with the write command.

At this time, it is assumed that a write destination block has had no storage area to which new data can be written.

The controller, to a NAND memory, selects, from the free blocks, a block to be newly allocated as a write destination block, and executes a data erase operation on the selected block (step S12). The controller then allocates the selected block as the write destination block.

The controller checks the numbers of times of erase of blocks in the NAND memory (step S13). In S13, the controller determines whether or not a difference in the number of times of erase which is a difference between the maximum number of times of erase and the minimum number of times of erase is larger than a setting value A. In a case where the difference in the number of times of erase is larger than the setting value A, the controller enables a wear-leveling copy operation. In addition, in a case where the difference in the number of times of erase is equal to or smaller than the setting value A, the controller disables the wear-leveling copy operation.

The controller writes the data into the NAND memory, based on the write command received in S11 (step S14).

The controller updates a cumulative data write amount in accordance with the amount of the data written to the NAND memory in S14 (step S15).

In a case where the wear-leveling copy operation is enabled and the cumulative data write amount updated in S15 exceeds a setting value B, the controller executes the wear-leveling copy operation of copying valid data to the NAND memory by the amount of a setting value C (step S16).

When the wear-leveling copy operation has been executed in S16, the controller resets the cumulative data write amount to an initial value (for example, 0) (step S17).

Figure 8:
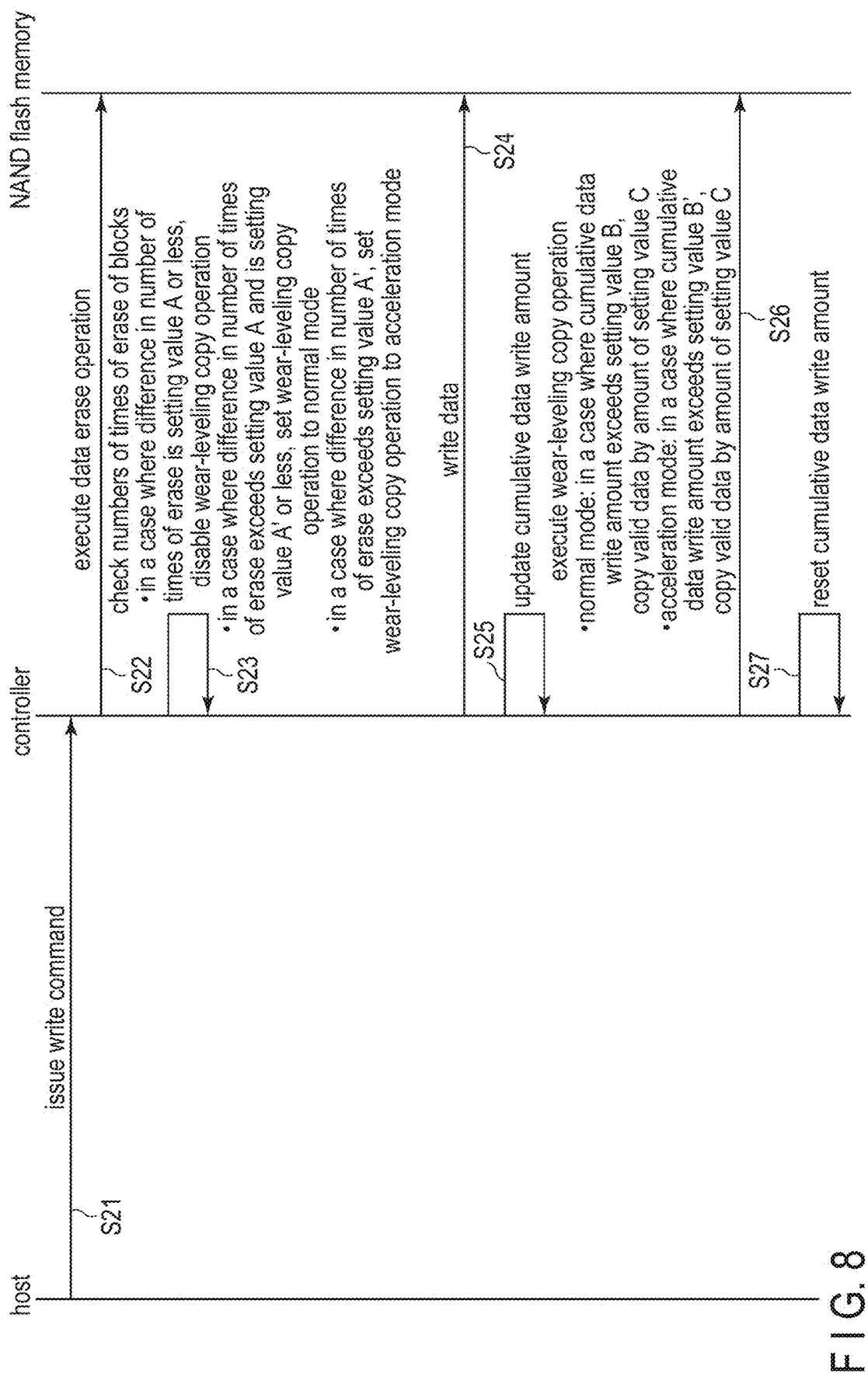
FIG. 8 is a sequence diagram illustrating the procedure of the wear-leveling copy operation executed in the memory system according to the first embodiment.

Next, a procedure of the wear-leveling copy operation in a case where the acceleration mode is used will be described. FIG. 8 is a sequence diagram illustrating the procedure of the wear-leveling copy operation executed in the memory system according to the first embodiment.

First, the host 2 issues a write command to the controller 4 of the SSD 3 (step S21). In S21, the host 2 transmits data along with the write command.

At this time, it is assumed that the write destination block has had no storage area to which new data can be written.

The controller 4, to the NAND memory 5, selects, from the free blocks, a block to be newly allocated as the write destination block, and executes the data erase operation on the selected block (step S22). The controller 4 then allocates the selected block as the write destination block.

The controller 4 checks the numbers of times of erase of the blocks in the NAND memory 5 (step S23). In step S23, the controller 4 determines whether or not a difference in the number of times of erase which is a difference between the maximum number of times of erase and the minimum number of times of erase is larger than the setting value A. In a case where the difference in the number of times of erase is equal to or smaller than the setting value A, the controller 4 disables the wear-leveling copy operation. In a case where the difference in the number of times of erase is larger than the setting value A, the controller 4 enables the wear-leveling copy operation. When the wear-leveling copy operation has been enabled, the controller 4 determines whether or not the difference in the number of times of erase is larger than the setting value A'. In a case where the difference in the number of times of erase is equal to or smaller than the setting value A' (that is, the difference in the number of times of erase is larger than the setting value A and is equal to or smaller than the setting value A'), the controller 4 sets the wear-leveling copy operation to the normal mode. In addition, in a case where the difference in the number of times of erase is larger than the setting value A', the controller 4 sets the wear-leveling copy operation to the acceleration mode.

The controller 4 writes the data into the NAND memory 5, based on the write command received in S21 (step S24).

The controller 4 updates the cumulative data write amount in accordance with the amount of the data written to the NAND memory 5 in S24 (step S25).

In a case where the wear-leveling copy operation is enabled and the cumulative data write amount satisfies a condition, the controller 4 executes the wear-leveling copy operation on the NAND memory 5 (step S26). In a case where the wear-leveling copy operation is in the normal mode, the controller 4 determines whether or not the cumulative data write amount updated in S25 exceeds the setting value B. In a case where the cumulative data write amount exceeds the setting value B, the controller 4 executes the wear-leveling copy operation of copying valid data by the amount of the setting value C. In addition, in a case where the wear-leveling copy operation is in the acceleration mode, the controller 4 determines whether or not the cumulative data write amount updated in S25 exceeds the setting value B'. In a case where the cumulative data write amount exceeds the setting value B', the controller 4 executes the wear-leveling copy operation of copying valid data by the amount of the setting value C.

When the wear-leveling copy operation has been executed in S26, the controller 4 resets the cumulative data write amount to an initial value (for example, 0) (step S27).

Figure 9B:
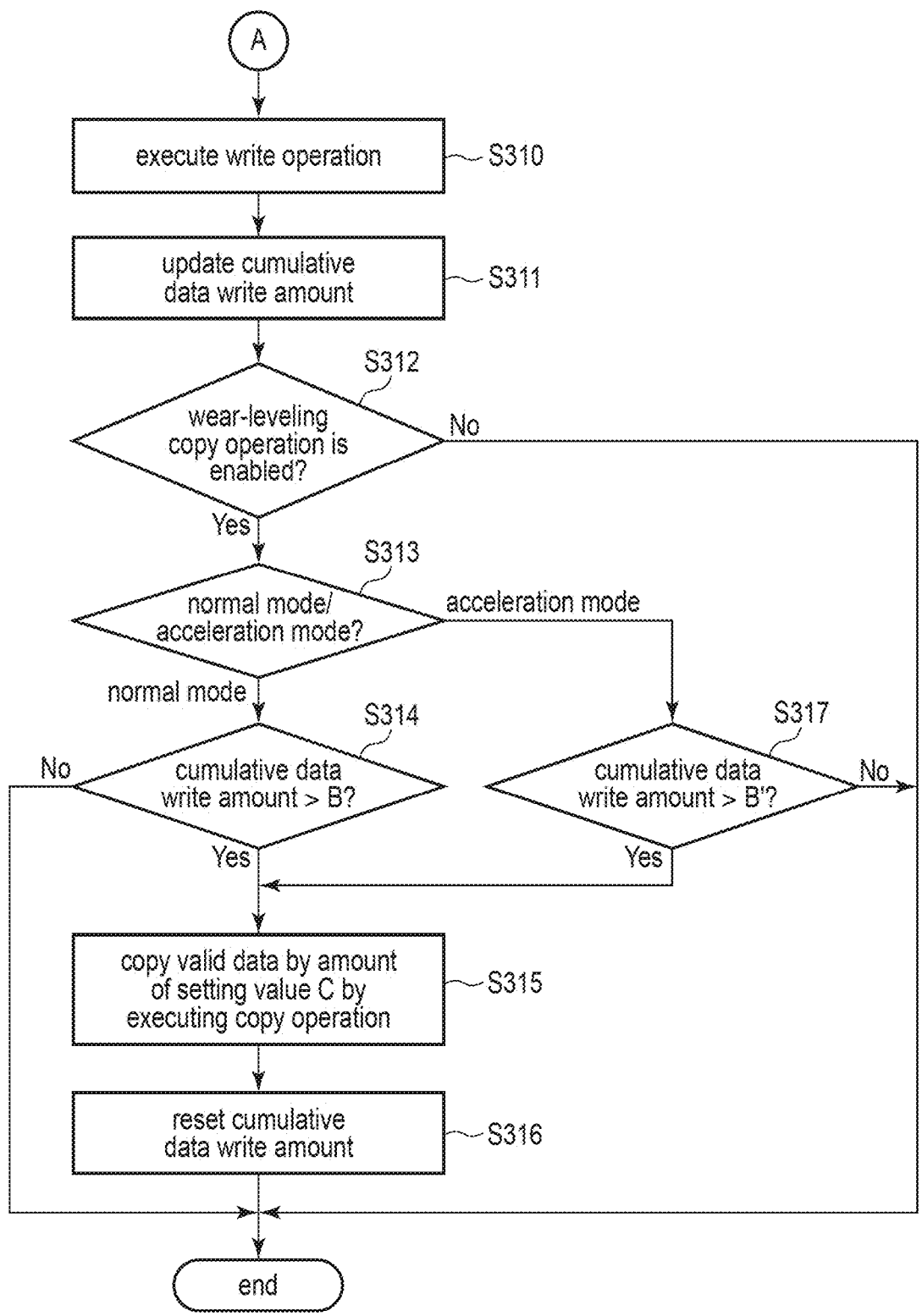
FIG. 9B is a flowchart illustrating another part of the procedure of the wear-leveling copy operation executed in the memory system according to the first embodiment.

Next, the procedure of the wear-leveling copy operation will be described. FIGS. 9A and 9B are flowcharts illustrating the procedure of the wear-leveling copy operation executed in the memory system according to the first embodiment.

First, the controller 4 determines whether or not a write command has been received from the host 2 (step S301).

In a case where a write command has not been received (No in S301), the controller 4 waits until a write command is received from the host 2.

In a case where a write command has been received (Yes in S301), the controller 4 determines whether or not a new write destination block is required by a write process based on the write command received in S301 (step S302).

In a case where a new write destination block is required (Yes in S302), the controller 4 selects a new write destination block from the free blocks and executes the data erase operation on the new write destination block (step S303).

In a case where a new write destination block is not required (No in S302), the controller 4 skips the procedure from S303 to S309 to be described later.

After the data erase operation is executed in S303, the controller 4 determines whether or not a difference in the number of times of erase is larger than the setting value A (step S304). The difference in the number of times of erase is a difference between the maximum number of times of erase and the minimum number of times of erase among the numbers of times of erase of the plurality of respective blocks.

In a case where the difference in the number of times of erase is larger than the setting value A (Yes in S304), the controller 4 enables the wear-leveling copy operation (step S305).

In a case where the difference in the number of times of erase is equal to or smaller than the setting value A (No in S304), the controller 4 disables the wear-leveling copy operation (step S306).

After the wear-leveling copy operation is disabled in S306, the controller 4 skips the procedure from S307 to S309 to be described later.

After the wear-leveling copy operation is enabled in step S305, the controller 4 determines whether or not the difference in the number of times of erase is larger than the setting value A' (step S307).

In a case where the difference in the number of times of erase is larger than the setting value A' (Yes in S307), the controller 4 sets the wear-leveling copy operation to the acceleration mode (step S308).

In a case where the difference in the number of times of erase is equal to or smaller than the setting value A' (No in S307), the controller 4 sets the wear-leveling copy operation to the normal mode (step S309).

The controller 4 executes a write operation based on the write command received in S301 (step S310 in FIG. 9B).

When the write operation in S310 is completed, the controller 4 updates the cumulative data write amount in accordance with the amount of data written to the NAND memory 5 (step S311).

The controller 4 determines whether or not the wear-leveling copy operation is enabled (step S312).

In a case where the wear-leveling copy operation is not enabled (No in S312), the controller 4 skips the procedure from S313 to S316 to be described later, and ends the wear-leveling copy operation.

In a case where the wear-leveling copy operation is enabled (Yes in S312), the controller 4 determines whether the wear-leveling copy operation is in the normal mode or the acceleration mode (step S313).

In a case where the wear-leveling copy operation is in the normal mode (normal mode in S313), the controller 4 determines whether or not the cumulative data write amount exceeds the setting value B (step S314).

In a case where the cumulative data write amount exceeds the setting value B (Yes in S314), the controller 4 copies valid data by the amount of the setting value C by executing a copy operation (step S315).

Then, the controller 4 resets the cumulative data write amount (step S316).

In addition, in a case where the cumulative data write amount is equal to or smaller than the setting value B (No in S314), the controller 4 skips S315 and S316 and ends the wear-leveling copy operation.

In a case where the wear-leveling copy operation is in the acceleration mode (acceleration mode in S313), the controller 4 determines whether or not the cumulative data write amount exceeds the setting value B' (step S317).

In a case where the cumulative data write amount exceeds the setting value B' (Yes in S317), the controller 4 copies valid data by the amount of the setting value C by executing a copy operation (step S315).

Then, the controller 4 resets the cumulative data write amount (step S316).

In addition, in a case where the cumulative data write amount is equal to or smaller than the setting value B' (No in S317), the controller 4 skips S315 and S316 and ends the wear-leveling copy operation.

As described above, according to the first embodiment, while the write process of writing data to the NAND memory 5 is executed based on the write command received from the host 2, the controller 4 checks the numbers of times of erase of the blocks in response to the data erase operation being executed. The controller 4 determines whether or not the difference between the maximum number of times of erase and the minimum number of times of erase among the numbers of times of erase of the plurality of respective blocks is larger than the setting value A. In a case where the difference in the number of times of erase is larger than the setting value A, the controller 4 enables the wear-leveling copy operation and determines whether or not the difference in the number of times of erase is larger than the setting value A'. Here, the setting value A' is a value larger than the setting value A.

When the difference in the number of times of erase is larger than the setting value A and is equal to or smaller than the setting value A', the controller 4 sets the wear-leveling copy operation to the normal mode. In a case where the wear-leveling copy operation is in the normal mode, the controller 4 executes the wear-leveling copy operation by the amount of the setting value C when the cumulative data write amount exceeds the setting value B.

In addition, in a case where the difference in the number of times of erase is larger than the setting value A', the controller 4 determines that the difference in the numbers of times of erase of the plurality of blocks are large and cannot be handled by the wear-leveling copy operation in the normal mode. Then, the controller 4 sets the wear-leveling copy operation to the acceleration mode. In a case where the wear-leveling copy operation is set to the acceleration mode and the cumulative data write amount exceeds the setting value B', the controller 4 executes the wear-leveling copy operation by the amount of the setting value C.

The setting value B' is a value smaller than the setting value B. Thus, while the wear-leveling copy operation is in the acceleration mode, the controller 4 executes the wear-leveling copy operation more frequently than in the normal mode. The amount of data to be copied in one wear-leveling copy operation is only the amount of the setting value C in both the normal mode and the acceleration mode. Thus, in the acceleration mode, a ratio of the amount of data copied to the NAND memory 5 by the wear-leveling copy operation to the amount of data written to the NAND memory 5 based on the write command received from the host 2 is larger than in the normal mode.

As described above, the controller 4 can select any one of two modes of the wear-leveling copy operation, based on the difference in the number of times of erase. The ratio of the amount of data copied to the NAND memory 5 is different between the two modes of the wear-leveling copy operation. Consequently, the amount of processing for leveling the numbers of times of erase of the blocks can be dynamically controlled based on a state of a current distribution of the numbers of times of erase of the blocks and the like.

Note that, in the present embodiment, although an example in which the difference between the minimum number of times of erase and the maximum number of times of erase among all the blocks to which data can be written is compared with the first threshold value has been described, for example, blocks other than specific blocks such as blocks in which system data is stored may be targets. The system data is data used for management of the SSD 3.

Second Embodiment

Next, a second embodiment will be described. A memory system according to the second embodiment controls a ratio of the amount of data copied to a NAND memory 5 by a wear-leveling copy operation to the amount of data written to the NAND memory 5, based on a write command received from a host 2 by changing the amount of data written to the NAND memory 5 by one wear-leveling copy operation between a normal mode and an acceleration mode.

Hereinafter, a description will be given focusing on differences from the first embodiment.

In a case where the wear-leveling copy operation is in the acceleration mode and a cumulative data write amount exceeds a third threshold value, a wear-leveling copy control unit 433 of an SSD 3 according to the second embodiment, executes the wear-leveling copy operation to copy valid data stored in a first block to a second block by a second amount. The third threshold value is the same value as a setting value B used in the normal mode. The second amount is a value larger than a first amount used in the normal mode. The second amount may be set in advance, for example, as a setting value C'. Consequently, in the wear-leveling copy operation in the acceleration mode, the amount of data copied in one wear-leveling copy operation is larger than in the wear-leveling copy operation in the normal mode.

The setting values used in the wear-leveling copy operation will be described. FIG. 10 is a diagram illustrating the setting values used in the wear-leveling copy operation executed in the memory system according to the second embodiment.

The setting values A and A' are similar to the setting values used in the first embodiment described with reference to FIG. 4.

The setting value B is a threshold value of the cumulative data write amount used in both the normal mode and the acceleration mode. In a case where the wear-leveling copy operation is enabled, a controller 4 compares the cumulative data write amount with the setting value B in response to the cumulative data write amount being updated. In a case where the cumulative data write amount exceeds the setting value B, the controller 4 executes the wear-leveling copy operation. In a case where the cumulative data write amount is equal to or smaller than the setting value B, the controller 4 does not execute the wear-leveling copy operation.

The setting value C is the amount of data copied in one wear-leveling copy operation and is used in the normal mode. In a case where the wear-leveling copy operation is in the normal mode, the controller 4 copies valid data from a copy source block to a copy destination block by the amount of the setting value C when the wear-leveling copy operation is executed.

The setting value C' is the amount of data copied in one wear-leveling copy operation and is used in the acceleration mode. In a case where the wear-leveling copy operation is in the acceleration mode, the controller 4 copies the amount of data of the setting value C' from a copy source block to a copy destination block when the wear-leveling copy operation is executed. The setting value C' is a value larger than the setting value C. That is, in the wear-leveling copy operation in the acceleration mode, the amount of data copied in one wear-leveling copy operation is larger than in the wear-leveling copy operation in the normal mode.

Figure 11:
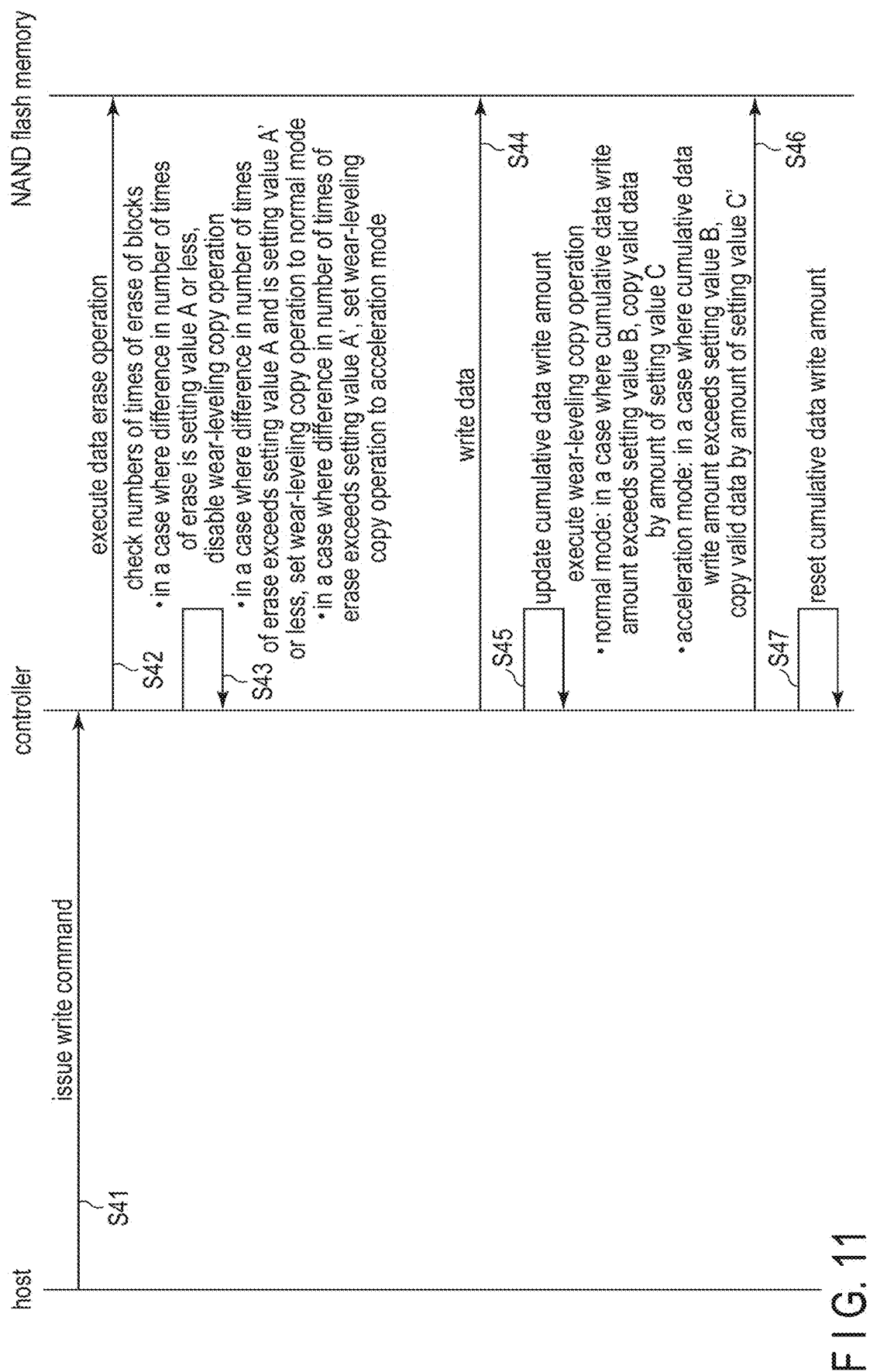
FIG. 11 is a sequence diagram illustrating a procedure of the wear-leveling copy operation executed in the memory system according to the second embodiment.

Next, a procedure of the wear-leveling copy operation in a case where the acceleration mode in the second embodiment is used will be described. FIG. 11 is a sequence diagram illustrating the procedure of the wear-leveling copy operation executed in the memory system according to the second embodiment.

In a process from S41 to S45, the process similar to the process from S21 to S25 described in FIG. 8 are executed.

In a case where the wear-leveling copy operation is enabled and the cumulative data write amount satisfies a condition, the controller 4 executes the wear-leveling copy operation on the NAND memory 5 (step S46). In a case where the wear-leveling copy operation is in the normal mode, the controller 4 determines whether or not the cumulative data write amount updated in S45 exceeds the setting value B. In a case where the cumulative data write amount exceeds the setting value B, the controller 4 executes the wear-leveling copy operation of copying valid data from a copy source block to a copy destination block by the amount of the setting value C.

In addition, in a case where the wear-leveling copy operation is in the acceleration mode, similarly to the normal mode, the controller 4 determines whether or not the cumulative data write amount updated in S45 exceeds the setting value B. In a case where the cumulative data write amount exceeds the setting value B, the controller 4 executes the wear-leveling copy operation of copying valid data from the copy source block to the copy destination block by the amount of the setting value C'.

When the wear-leveling copy operation has been executed in S46, the controller 4 resets the cumulative data write amount to an initial value (for example, 0) (step S47).

Figure 12A:
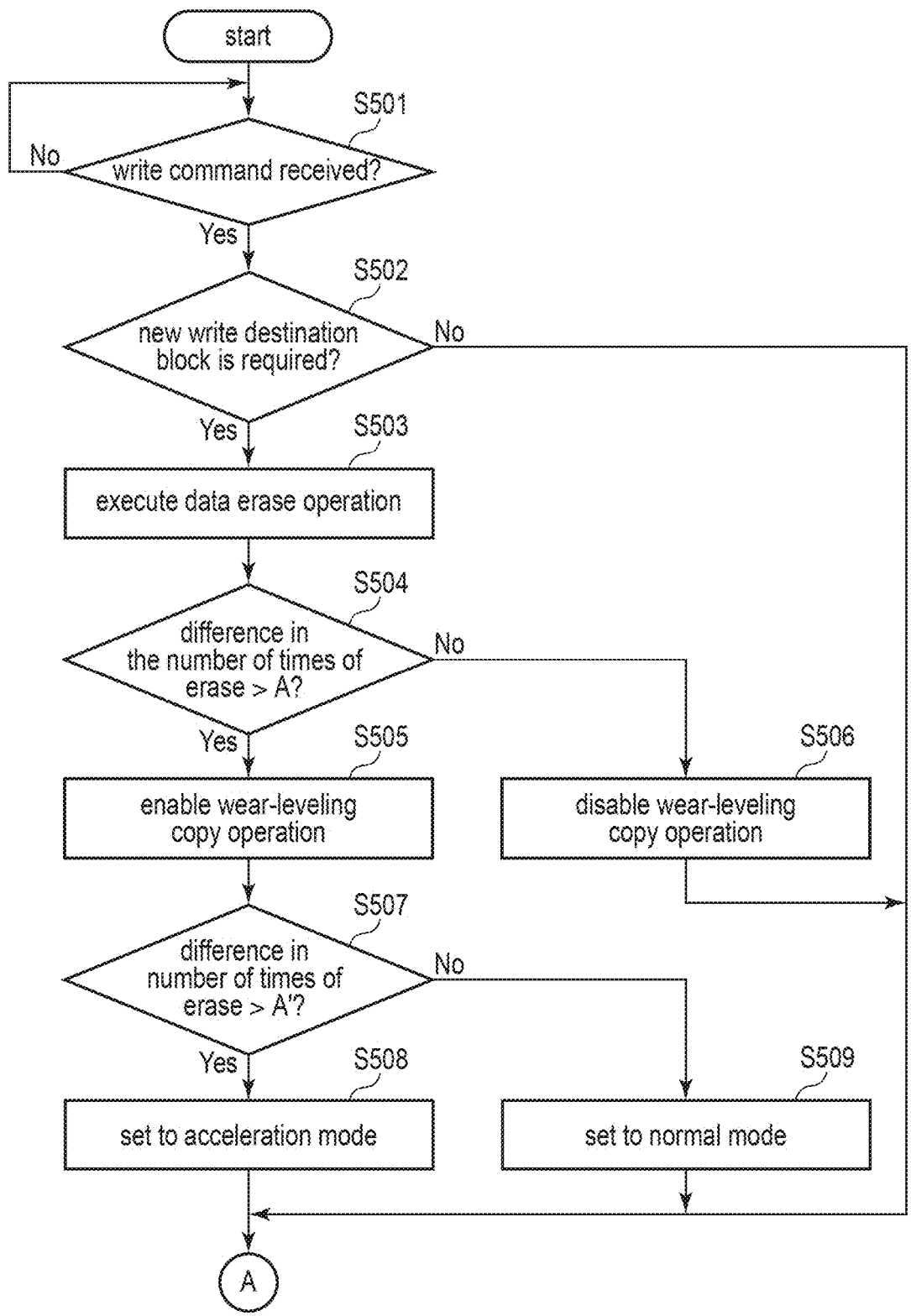
FIG. 12A is a flowchart illustrating a part of the procedure of the wear-leveling copy operation executed in the memory system according to the second embodiment.
Figure 12B:
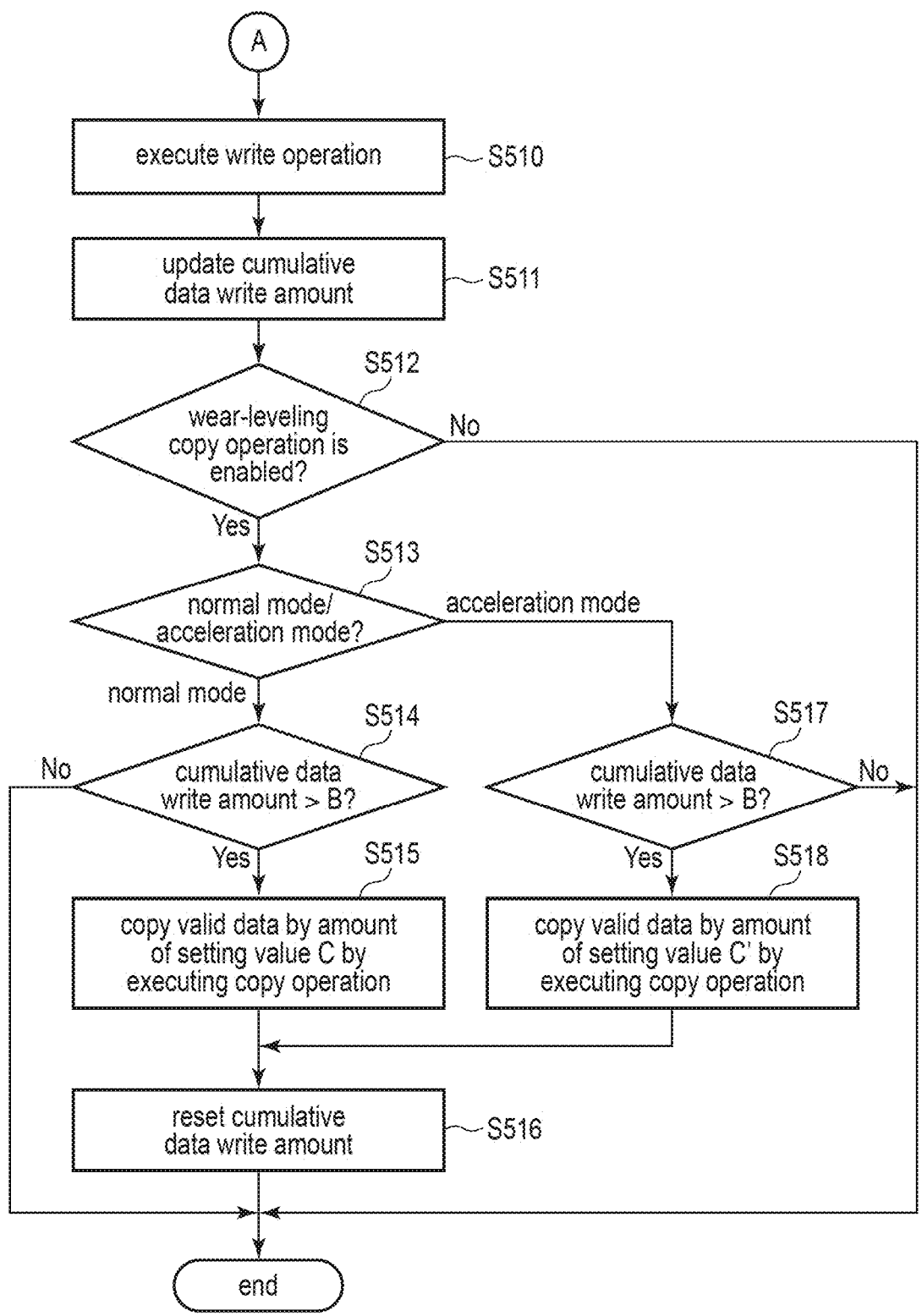
FIG. 12B is a flowchart illustrating another part of the procedure of the wear-leveling copy operation executed in the memory system according to the second embodiment.

Next, a procedure of the wear-leveling copy operation will be described. FIGS. 12A and 12B are flowcharts illustrating a procedure of the wear-leveling copy operation executed in the memory system according to the second embodiment.

In a process from S501 to S512, the process similar to the process from S301 to S312 described in FIGS. 9A and 9B are executed.

In a case where the wear-leveling copy operation is enabled (Yes in S512), the controller 4 determines whether the wear-leveling copy operation is in the normal mode or the acceleration mode (step S513).

In a case where the wear-leveling copy operation is in the normal mode (normal mode in S513), the controller 4 determines whether or not the cumulative data write amount exceeds the setting value B (step S514).

In a case where the cumulative data write amount exceeds the setting value B (Yes in S514), the controller 4 copies valid data by the amount of the setting value C by executing the copy operation (step S515).

Then, the controller 4 resets the cumulative data write amount to an initial value (step S516).

In addition, in a case where the cumulative data write amount is equal to or smaller than the setting value B (No in S514), the controller 4 skips S515 and S516 and ends the wear-leveling copy operation.

In a case where the wear-leveling copy operation is in the acceleration mode (acceleration mode in S513), the controller 4 determines whether or not the cumulative data write amount exceeds the setting value B (step S517).

In a case where the cumulative data write amount exceeds the setting value B (Yes in S517), the controller 4 copies valid data by the amount of the setting value C' by executing the copy operation (step S518).

The controller 4 resets the cumulative data write amount to the initial value (step S516).

In addition, in a case where the cumulative data write amount is equal to or smaller than the setting value B (No in S517), the controller 4 skips S518 and S516 and ends the wear-leveling copy operation.

As described above, according to the second embodiment, in a case where the wear-leveling copy operation is in the acceleration mode and the cumulative data write amount exceeds the setting value B, the controller 4 executes the wear-leveling copy operation of copying data stored in the copy source block to the copy destination block by the amount of the setting value C'. The setting value C' is a value larger than the setting value C that corresponds to the amount of data copied from the copy source block to the copy destination block by one wear-leveling copy operation in the normal mode. Thus, while the wear-leveling copy operation is in the acceleration mode, the amount of data written to the NAND memory 5 by the controller 4 by one wear-leveling copy operation is larger than in the normal mode. The threshold value of the cumulative data write amount related to the frequency at which the wear-leveling copy operation is executed is the setting value B in both the normal mode and the acceleration mode. Thus, in the acceleration mode, the ratio of the amount of data copied to the NAND memory 5 by the wear-leveling copy operation to the amount of data written to the NAND memory 5 based on write commands received from the host 2 is larger than in the normal mode.

As described above, in the configuration described in the second embodiment, the controller 4 can also select any one of two modes of the wear-leveling copy operation based on the difference in the number of times of erase. The ratio of the amount of data copied to the NAND memory 5 is different between the two modes of the wear-leveling copy operation. Consequently, the amount of processing for leveling the numbers of times of erase of the blocks can be dynamically controlled based on a state of a current distribution of the numbers of times of erase of the blocks and the like.

In the configurations described in the first embodiment and the second embodiment, in a case where the difference between the maximum number of times of erase and the minimum number of times of erase among the numbers of times of erase of the plurality of blocks is larger than the setting value A', the controller 4 sets the wear-leveling copy operation to the acceleration mode. In this case, even in a case where the numbers of times of erase of only a small number of specific blocks are extremely high or low, the wear-leveling copy operation is set to the acceleration mode. Since the wear-leveling copy operation can be executed for a small number of blocks by the processing in the normal mode, in such a case, it is not desirable that the wear-leveling copy operation is set to the acceleration mode. Thus, in a third embodiment and a fourth embodiment to be described later, a case where the wear-leveling copy operation is set to the normal mode or the acceleration mode by using an average of the numbers of times of erase instead of the minimum number of times of erase or the maximum number of times of erase will be described.

Third Embodiment

Next, the third embodiment in which a wear-leveling copy operation is set to a normal mode or an acceleration mode by using a difference between the maximum number of times of erase (or the minimum number of times of erase) and the average number of times of erase when the numbers of times of erase of blocks are checked will be described.

Hereinafter, a description will be given focusing on differences from the first embodiment.

In response to the wear-leveling copy operation being enabled, a wear-leveling copy control unit 433 of an SSD 3 according to the third embodiment compares, with a fifth threshold value, a difference between one of the maximum number of times of erase and the minimum number of times of erase and the average of the numbers of times of erase of the respective blocks of the SSD 3. The difference between one of the maximum number of times of erase and the minimum number of times of erase and the average of the numbers of times of erase of the respective blocks of the SSD 3 is also referred to as a second difference. The fifth threshold value may be set in advance, for example, as a setting value D. In a case where the second difference is equal to or smaller than the setting value D, the wear-leveling copy control unit 433 sets the wear-leveling copy operation to the normal mode. In a case where the second difference is larger than the setting value D, the wear-leveling copy control unit 433 sets the wear-leveling copy operation to the acceleration mode. Hereinafter, a case where the difference between the maximum number of times of erase and the average of the numbers of times of erase is used will be described, but, instead of this difference, a difference between the minimum number of times of erase and the average of the numbers of times of erase may be used.

The setting values used in the wear-leveling copy operation will be described. FIG. 13 is a diagram illustrating the setting values used in the wear-leveling copy operation executed in the memory system according to the third embodiment.

The setting values A, B, B', and C are similar to the setting values A, B, B', and C used in the first embodiment described with reference to FIG. 4.

The setting value D is a threshold value for determining whether or not to set the wear-leveling copy operation to the acceleration mode. In a case where the wear-leveling copy operation is enabled, a controller 4 compares the setting value D with a difference between the maximum number of times of erase and the average of the numbers of times of erase. In a case where the difference is equal to or smaller than the setting value D, the controller 4 sets the wear-leveling copy operation to the normal mode. In addition, in a case where the difference is larger than the setting value D, the controller 4 sets the wear-leveling copy operation to the acceleration mode. That is, in a case where the difference between the maximum number of times of erase and the minimum number of times of erase among the numbers of times of erase of the plurality of respective blocks is larger than the setting value A and the difference between the maximum number of times of erase and the average of the numbers of times of erase is equal to or smaller than the setting value D, the controller 4 sets the wear-leveling copy operation to the normal mode. In addition, in a case where the difference between the maximum number of times of erase and the minimum number of times of erase is larger than the setting value A and the difference between the maximum number of times of erase and the average of the numbers of times of erase is larger than the setting value D, the controller 4 sets the wear-leveling copy operation to the acceleration mode.

Next, a distribution of the numbers of times of erase of blocks in a case where the wear-leveling copy operation is set to the normal mode will be described. FIG. 14 is a diagram illustrating the distribution of the numbers of times of erase of blocks in a first case where the wear-leveling copy operation executed in the memory system according to the third embodiment is set to the normal mode.

A vertical axis represents the number of times of erase of a block. A horizontal axis indicates a block number of a block. In FIG. 14, the numbers of times of erase of 100 blocks that have block numbers 1 to 100, respectively, are plotted.

Here, it is assumed that the setting value A is set to 200 and the setting value D is set to 180.

A block having the maximum number of times of erase among the numbers of times of erase of the plurality of respective blocks is a block having a block number 10 (hereinafter, referred to as a block 10). The number of times of erase of the block 10 is 502 times.

On the other hand, a block having the minimum number of times of erase among the numbers of times of erase of the plurality of respective blocks is a block having a block number 28 (hereinafter, referred to as a block 28). The number of times of erase of the block 28 is 298 times.

In addition, the average of the numbers of times of erase of the blocks is 397 times.

It is assumed that checking the numbers of times of erase of the blocks is executed on the distribution of the numbers of times of erase illustrated in FIG. 14.

First, the controller 4 determines whether or not to enable the wear-leveling copy operation by comparing a difference between the maximum number of times of erase and the minimum number of times of erase with the setting value A. The difference between the maximum number of times of erase and the minimum number of times of erase is a difference between the number of times of erase of the block 10 and the number of times of erase of the block 28. Thus, the difference in the number of times of erase is 502−298=204. When the difference in the number of times of erase is compared with the setting value A, since the difference in the number of times of erase is larger than the setting value A (204>200), the controller 4 enables the wear-leveling copy operation.

Subsequently, the controller 4 determines whether to set the wear-leveling copy operation to the normal mode or the acceleration mode by comparing a difference between the maximum number of times of erase and the average of the numbers of times of erase with the setting value D. Since the maximum number of times of erase is the number of times of erase of the block 10, the difference between the maximum number of times of erase and the average of the numbers of times of erase is 502−397=105. When the difference between the maximum number of times of erase and the average of the numbers of times of erase is compared with the setting value D, since the difference between the maximum number of times of erase and the average of the numbers of times of erase is equal to or smaller than the setting value D (105<180), the controller 4 sets the wear-leveling copy operation to the normal mode.

Figure 15:
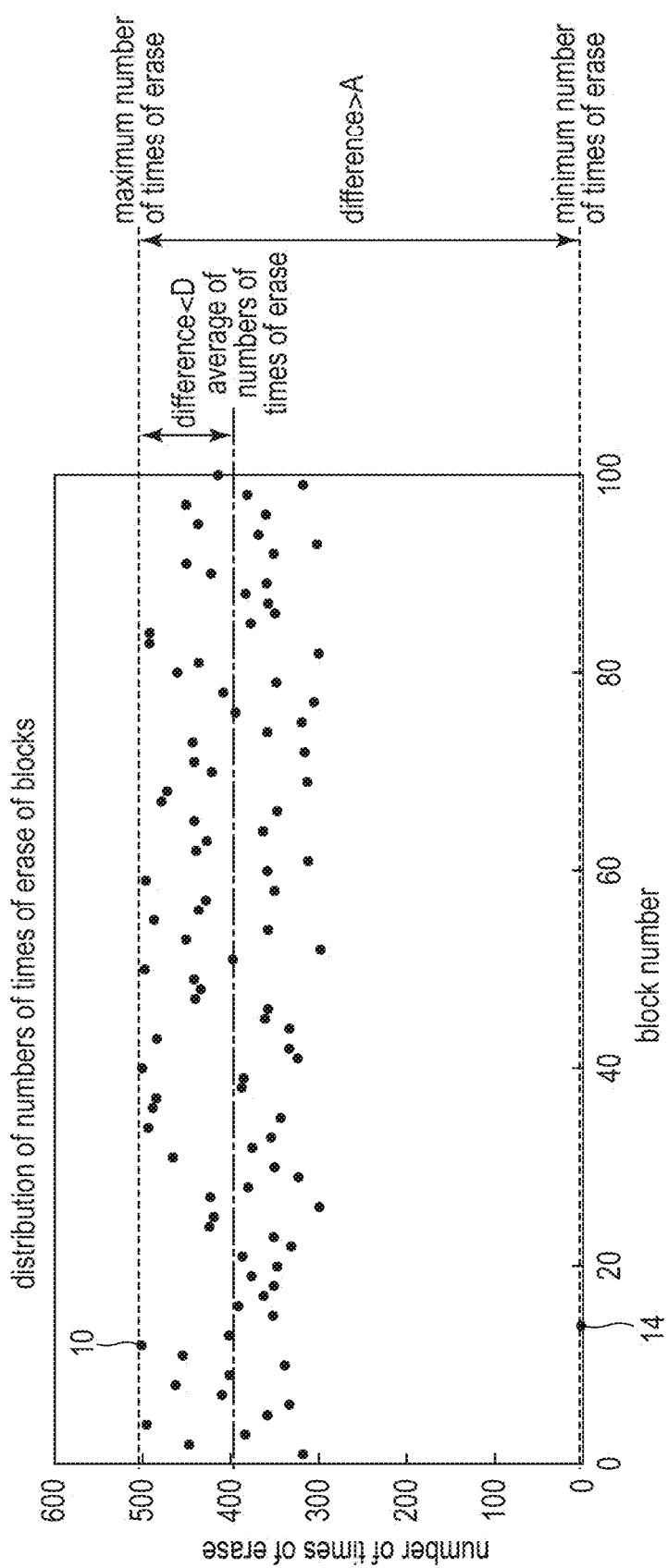
FIG. 15 is a diagram illustrating a distribution of numbers of times of erase of blocks in a second case where the wear-leveling copy operation executed in the memory system according to the third embodiment is set to the normal mode.

Next, a distribution of the numbers of times of erase of blocks in a second case where the wear-leveling copy operation is set to the normal mode will be described. FIG. 15 is a diagram illustrating the distribution of the numbers of times of erase of blocks in a second case where the wear-leveling copy operation executed in the memory system according to the third embodiment is set to the normal mode.

A vertical axis represents the number of times of erase of a block. A horizontal axis indicates a block number of a block. In FIG. 15, the numbers of times of erase of 100 blocks that have block numbers 1 to 100, respectively, are plotted.

Here, it is assumed that the setting value A is set to 200 and the setting value D is set to 180.

A block having the maximum number of times of erase among the numbers of times of erase of the plurality of respective blocks is a block having a block number 10 (hereinafter, referred to as a block 10). The number of times of erase of the block 10 is 502 times.

On the other hand, a block having the minimum number of times of erase among the numbers of times of erase of the plurality of respective blocks is a block having a block number 14 (hereinafter, referred to as a block 14). The number of times of erase of the block 14 is two times.

In addition, the average of the numbers of times of erase of the blocks is 399 times.

It is assumed that checking the numbers of times of erase of the blocks is executed on the distribution of the numbers of times of erase illustrated in FIG. 15.

First, the controller 4 determines whether or not to enable the wear-leveling copy operation by comparing a difference between the maximum number of times of erase and the minimum number of times of erase with the setting value A. The difference between the maximum number of times of erase and the minimum number of times of erase is a difference between the number of times of erase of the block 10 and the number of times of erase of the block 14. Thus, the difference in the number of times of erase is 502−2=500. When the difference in the number of times of erase is compared with the setting value A, since the difference in the number of times of erase is larger than the setting value A (500>200), the controller 4 enables the wear-leveling copy operation.

Subsequently, the controller 4 determines whether to set the wear-leveling copy operation to the normal mode or the acceleration mode by comparing a difference between the maximum number of times of erase and the average of the numbers of times of erase with the setting value D. Since the maximum number of times of erase is the number of times of erase of the block 10, the difference between the maximum number of times of erase and the average number of times of erase is 502−399=103. When the controller 4 compares the difference between the maximum number of times of erase and the average of the numbers of times of erase with the setting value D, since the difference between the maximum number of times of erase and the average of the numbers of times of erase is equal to or smaller than the setting value D (103<180), the controller 4 sets the wear-leveling copy operation to the normal mode.

As described above, in a case where only the number of times of erase of a certain block is small, a difference between the maximum number of times of erase and the minimum number of times of erase greatly exceeds the setting value A, but there is no problem in a degree of wear-out of the entire SSD 3. Thus, due to the use of the average of the numbers of times of erase instead of the minimum number of times of erase, it is possible to determine whether or not to set the wear-leveling copy operation to the acceleration mode in consideration of the numbers of times of erase of the blocks of the entire SSD 3.

Figure 16:
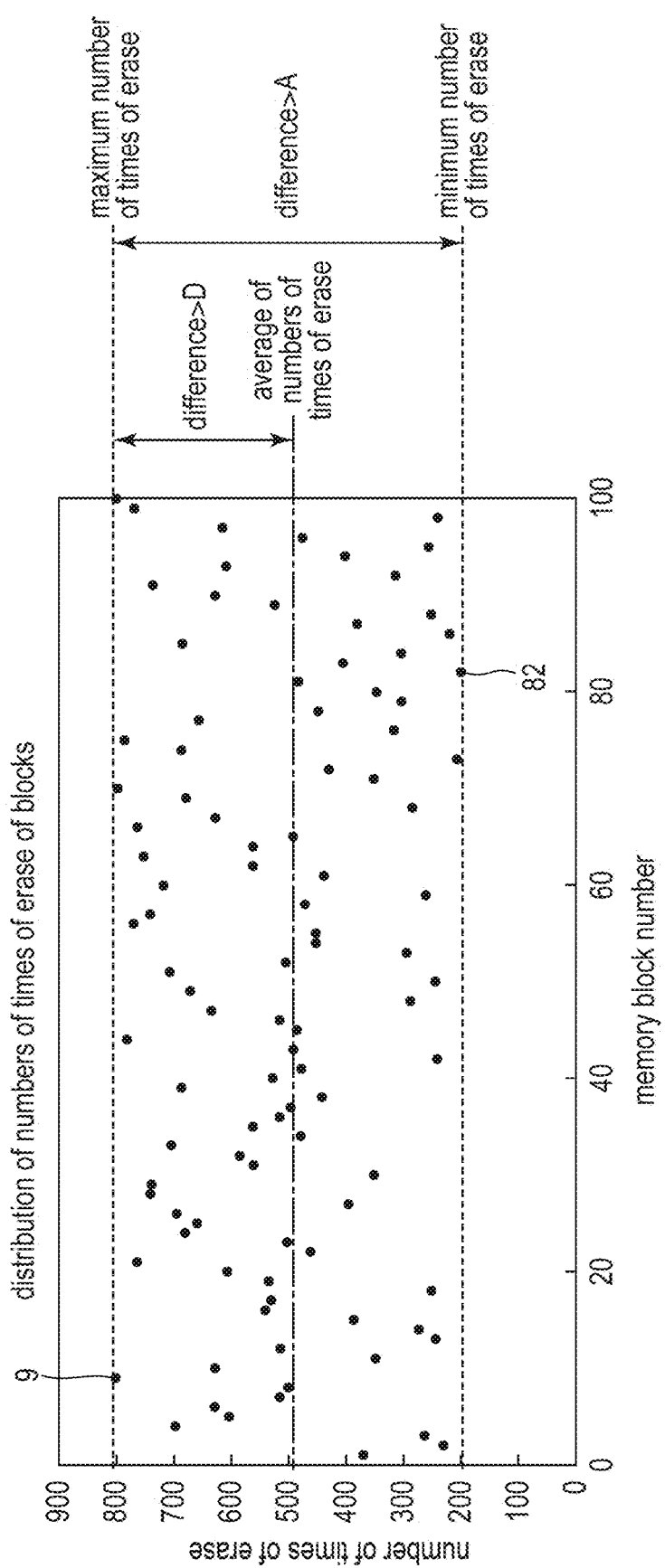
FIG. 16 is a diagram illustrating a distribution of the numbers of times of erase of blocks in a case where the wear-leveling copy operation executed in the memory system according to the third embodiment is set to an acceleration mode.

Next, a distribution of the numbers of times of erase of blocks in a case where the wear-leveling copy operation is set to the acceleration mode will be described. FIG. 16 is a diagram illustrating the distribution of the numbers of times of erase of blocks in a case where the wear-leveling copy operation executed in the memory system according to the third embodiment is set to the acceleration mode.

A vertical axis represents the number of times of erase of a block. A horizontal axis indicates a block number of a block. In FIG. 16, the numbers of times of erase of 100 blocks that have block numbers 1 to 100, respectively, are plotted.

Here, it is assumed that the setting value A is set to 200 and the setting value D is set to 180.

A block having the maximum number of times of erase among the numbers of times of erase of the plurality of respective blocks is a block having a block number 9 (hereinafter, referred to as a block 9). The number of times of erase of the block 9 is 802 times.

On the other hand, a block having the minimum number of times of erase among the numbers of times of erase of the plurality of respective blocks is a block having a block number 82 (hereinafter, referred to as a block 82). The number of times of erase of the block 82 is 201 times.

In addition, the average of the numbers of times of erase of the blocks is 511 times.

It is assumed that checking the numbers of times of erase of the blocks is executed on the distribution of the numbers of times of erase illustrated in FIG. 16.

First, the controller 4 determines whether or not to enable the wear-leveling copy operation by comparing a difference between the maximum number of times of erase and the minimum number of times of erase with the setting value A. The difference between the maximum number of times of erase and the minimum number of times of erase is a difference between the number of times of erase of the block 9 and the number of times of erase of the block 82. Thus, the difference in the number of times of erase is 802−201=601. When the difference in the number of times of erase is compared with the setting value A, since the difference in the number of times of erase is larger than the setting value A (601>200), the controller 4 enables the wear-leveling copy operation.

Subsequently, the controller 4 determines whether to set the wear-leveling copy operation to the normal mode or the acceleration mode by comparing a difference between the maximum number of times of erase and the average of the numbers of times of erase with the setting value D. Since the maximum number of times of erase is the number of times of erase of the block 9, the difference between the maximum number of times of erase and the average of the numbers of times of erase is 802−511=291. When the difference between the maximum number of times of erase and the average of the numbers of times of erase is compared with the setting value D, since the difference between the maximum number of times of erase and the average of the numbers of times of erase is larger than the setting value D (291>180), the controller 4 sets the wear-leveling copy operation to the acceleration mode.

Figure 17:
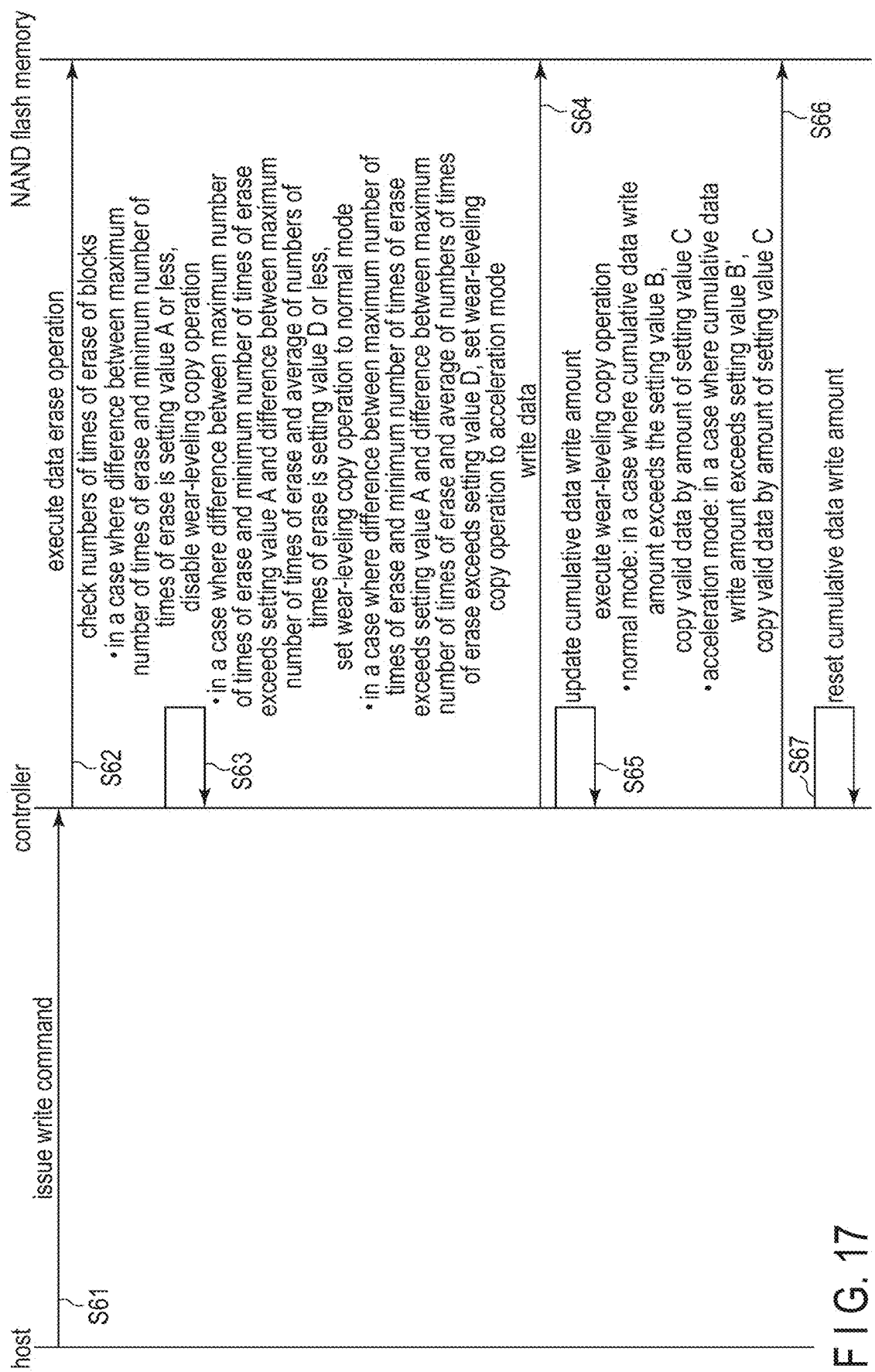
FIG. 17 is a sequence diagram illustrating a procedure of the wear-leveling copy operation executed in the memory system according to the third embodiment.

Next, a procedure of the wear-leveling copy operation will be described. FIG. 17 is a sequence diagram illustrating the procedure of the wear-leveling copy operation executed in the memory system according to the third embodiment.

In a process in S61 and S62, the process similar to the process in S21 and S22 described in FIG. 8 are executed.

The controller 4 checks the numbers of times of erase of the blocks in a NAND memory 5 (step S63). In step S63, the controller 4 determines whether or not a difference between the maximum number of times of erase and the minimum number of times of erase is larger than the setting value A. In a case where the difference between the maximum number of times of erase and the minimum number of times of erase is equal to or less than the setting value A, the controller 4 disables the wear-leveling copy operation. In a case where the difference between the maximum number of times of erase and the minimum number of times of erase is larger than the setting value A, the controller 4 enables the wear-leveling copy operation.

When the wear-leveling copy operation is enabled, the controller 4 determines whether or not a difference between the maximum number of times of erase and the average of the numbers of times of erase is larger than the setting value D. In a case where the difference between the maximum number of times of erase and the average of the numbers of times of erase is equal to or smaller than the setting value D (that is, the difference between the maximum number of times of erase and the minimum number of times of erase is larger than the setting value A and the difference between the maximum number of times of erase and the average of the numbers of times of erase is equal to or smaller than D), the controller 4 sets the wear-leveling copy operation to the normal mode. In addition, in a case where the difference between the maximum number of times of erase and the average of the numbers of times of erase is larger than the setting value D (that is, the difference between the maximum number of times of erase and the minimum number of times of erase is larger than the setting value A and the difference between the maximum number of times of erase and the average of the numbers of times of erase is larger than D), the controller 4 sets the wear-leveling copy operation to the acceleration mode.

In a process from S64 to S67, the process similar to the process from S24 to S27 described in FIG. 8 are executed.

Figure 18A:
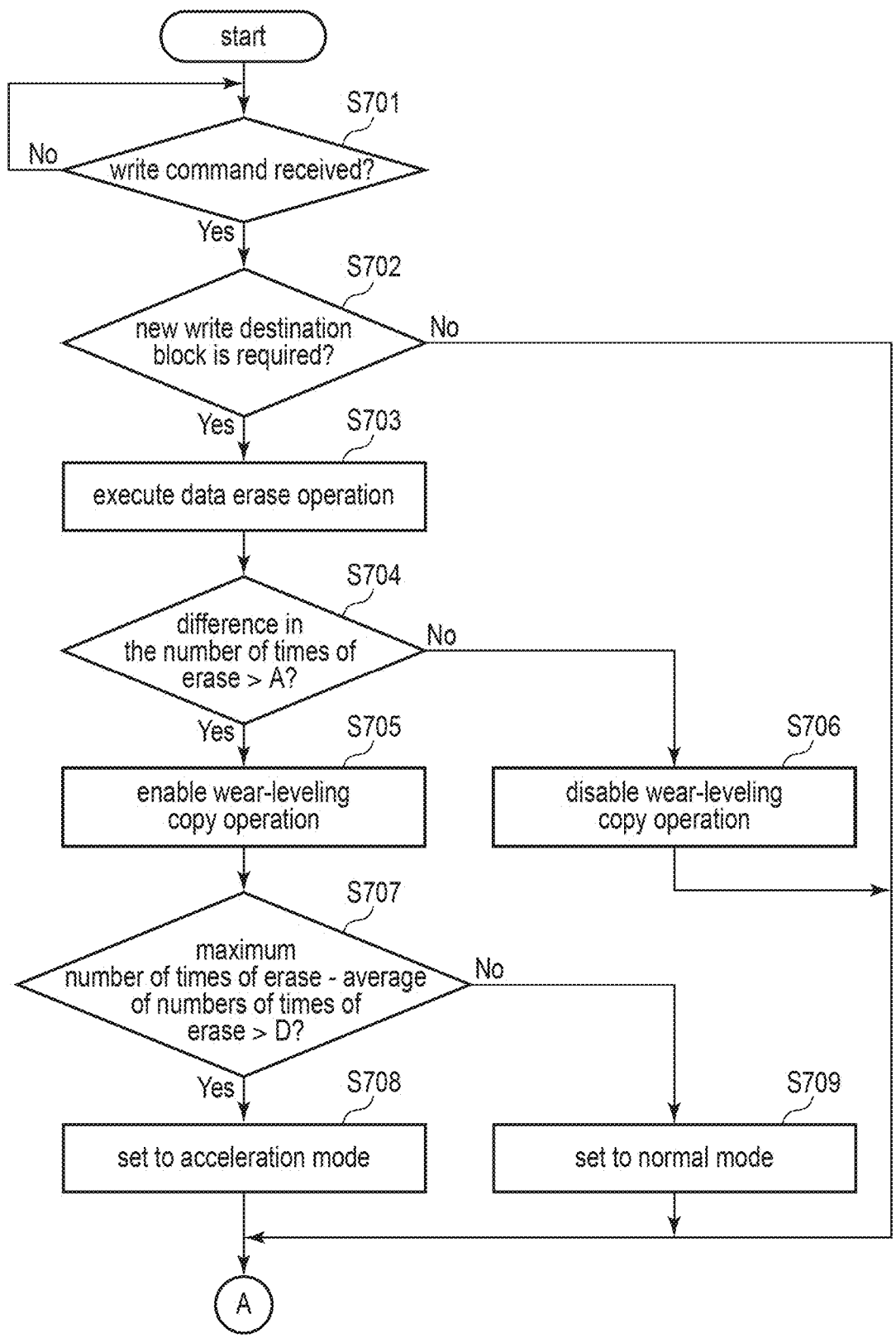
FIG. 18A is a flowchart illustrating a part of the procedure of the wear-leveling copy operation executed in the memory system according to the third embodiment.
Figure 18B:
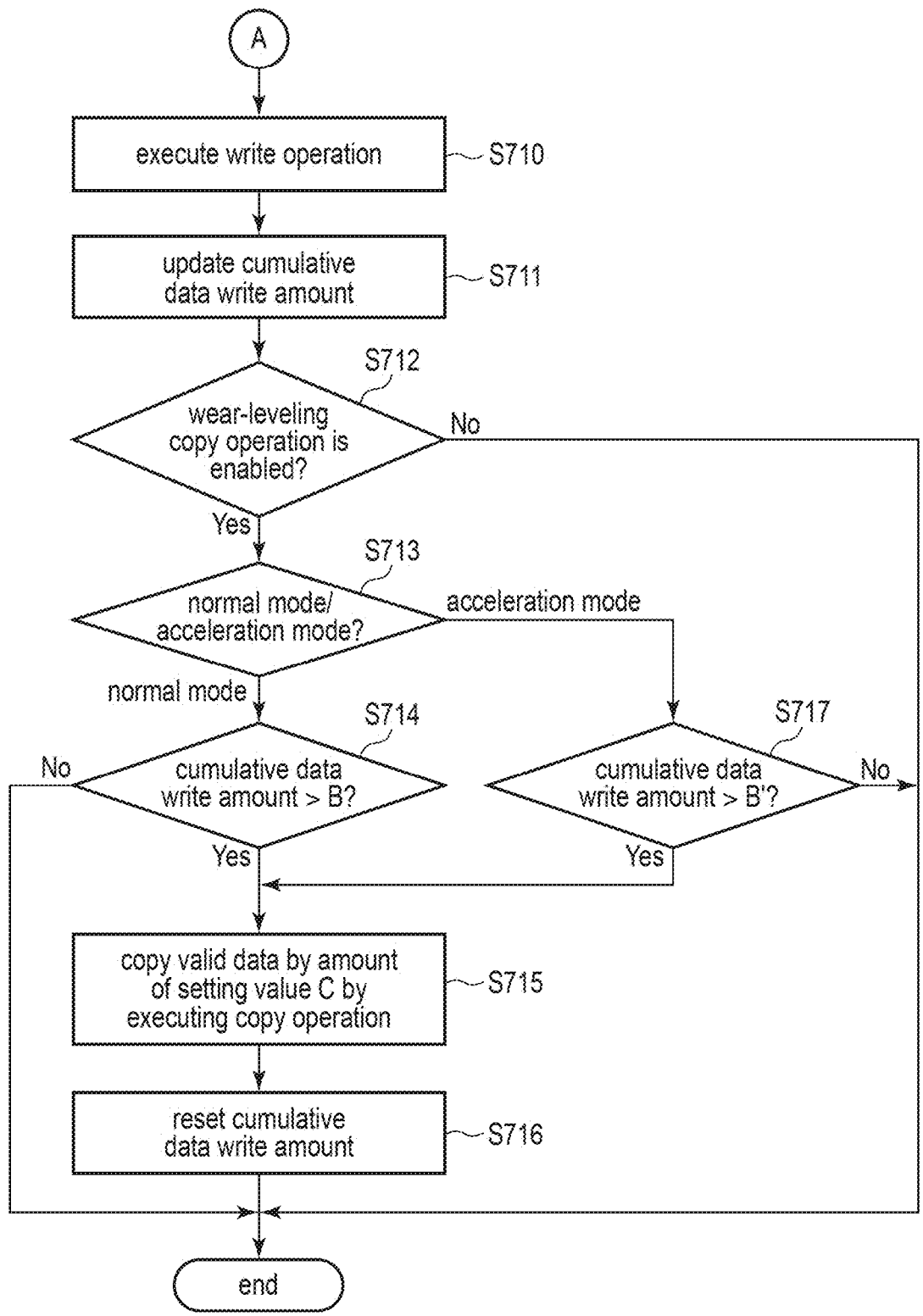
FIG. 18B is a flowchart illustrating another part of the procedure of the wear-leveling copy operation executed in the memory system according to the third embodiment.

Next, a procedure of the wear-leveling copy operation will be described. FIGS. 18A and 18B are flowcharts illustrating the procedure of the wear-leveling copy operation executed in the memory system according to the third embodiment.

In a process from S701 to S703, the process similar to the process from S301 to S303 described in FIG. 9A are executed.

After the data erase operation is executed in S703, the controller 4 determines whether or not a difference in the number of times of erase which is a difference between the maximum number of times of erase and the minimum number of times of erase among the numbers of times of erase of the plurality of blocks is larger than the setting value A (step S704).

In a case where the difference between the maximum number of times of erase and the minimum number of times of erase is larger than the setting value A (Yes in S704), the controller 4 enables the wear-leveling copy operation (step S705).

In a case where the difference between the maximum number of times of erase and the minimum number of times of erase is equal to or smaller than the setting value A (No in S704), the controller 4 disables the wear-leveling copy operation (step S706).

After the wear-leveling copy operation is disabled in S706, the controller 4 skips the procedure from S707 to S709 to be described later.

After the wear-leveling copy operation is enabled in step S705, the controller 4 determines whether or not a difference between the maximum number of times of erase and the average of the numbers of times of erase is larger than the setting value D (step S707).

In a case where the difference between the maximum number of times of erase and the average of the numbers of times of erase is larger than the setting value D (Yes in S707), the controller 4 sets the wear-leveling copy operation to the acceleration mode (step S708).

In a case where the difference between the maximum number of times of erase and the average of the numbers of times of erase is equal to or smaller than the setting value D (No in S707), the controller 4 sets the wear-leveling copy operation to the normal mode (step S709).

In a process from S710 to S716 in FIG. 18B, the process similar to the process from S310 to S316 described in FIG. 9B are executed.

As described above, according to the third embodiment, the controller 4 can determine whether to set the wear-leveling copy operation to the normal mode or the acceleration mode, based on the average of the numbers of times of erase of the plurality of respective blocks. Consequently, even in a case where only the numbers of times of erase of a specific small number of blocks are low, it is possible to avoid unnecessary setting of the wear-leveling copy operation to the acceleration mode. That is, the mode of the wear-leveling copy operation can be set based on the bias of the numbers of times of erase of all the blocks of the SSD 3 by using the average of the numbers of times of erase.

In addition, the controller 4 may compare, instead of the difference between the maximum number of times of erase and the average of the numbers of times of erase, the difference between the average of the numbers of times of erase and the minimum number of times of erase with the setting value D. In this case, even in a case where only the numbers of times of erase of a specific small number of blocks are high, it is possible to avoid unnecessary setting of the wear-leveling copy operation to the acceleration mode.

Fourth Embodiment

Next, a memory system according to the fourth embodiment will be described. In the fourth embodiment, similarly to the third embodiment, a ratio of the amount of data copied to a NAND memory 5 by a wear-leveling copy operation is controlled in accordance with the amount of data written to the NAND memory 5 by a write command. The memory system of the fourth embodiment determines whether to set the wear-leveling copy operation to a normal mode or an acceleration mode by using the average of the numbers of times of erase of a plurality of respective blocks, and changes the amount of data written to the NAND memory 5 by one wear-leveling copy operation between the normal mode and the acceleration mode.

Hereinafter, a description will be given focusing on differences from the third embodiment.

In a case where the wear-leveling copy operation is in the acceleration mode and the cumulative data write amount exceeds a third threshold value, a wear-leveling copy control unit 433 of an SSD 3 according to the fourth embodiment executes the wear-leveling copy operation to copy valid data stored in a first block to a second block by a second amount. The third threshold value is the same value as a setting value B used in the normal mode. The second amount is a value larger than a first amount used in the normal mode. The second amount may be set in advance, for example, as a setting value C'. Consequently, in the wear-leveling copy operation set in the acceleration mode, the amount of data copied in one wear-leveling copy operation is larger than in the wear-leveling copy operation set in the normal mode.

The setting values used in the wear-leveling copy operation will be described. FIG. 19 is a diagram illustrating the setting values used in the wear-leveling copy operation of the memory system according to the fourth embodiment.

The setting values A and D are similar to the setting values used in the third embodiment described with reference to FIG. 13.

The setting value B is a threshold value of the cumulative data write amount and is used in both the normal mode and the acceleration mode. In a case where the wear-leveling copy operation is enabled, a controller 4 compares the cumulative data write amount with the setting value B in response to the cumulative data write amount being updated. In a case where the cumulative data write amount exceeds the setting value B, the controller 4 executes the wear-leveling copy operation. In a case where the cumulative data write amount is equal to or smaller than the setting value B, the controller 4 does not execute the wear-leveling copy operation.

The setting value C is the amount of data copied in one wear-leveling copy operation and is used in the normal mode. In a case where the wear-leveling copy operation is in the normal mode, the controller 4 copies valid data from a copy source block to a copy destination block by the amount of the setting value C when the wear-leveling copy operation is executed.

The setting value C' is the amount of data copied in one wear-leveling copy operation and is used in the acceleration mode. In a case where the wear-leveling copy operation is in the acceleration mode, the controller 4 copies data from a copy source block to a copy destination block by the amount of the setting value C' when the wear-leveling copy operation is executed. The setting value C' is a value larger than the setting value C. That is, in the wear-leveling copy operation in the acceleration mode, the amount of data copied in one wear-leveling copy operation is larger than in the wear-leveling copy operation in the normal mode.

Figure 20:
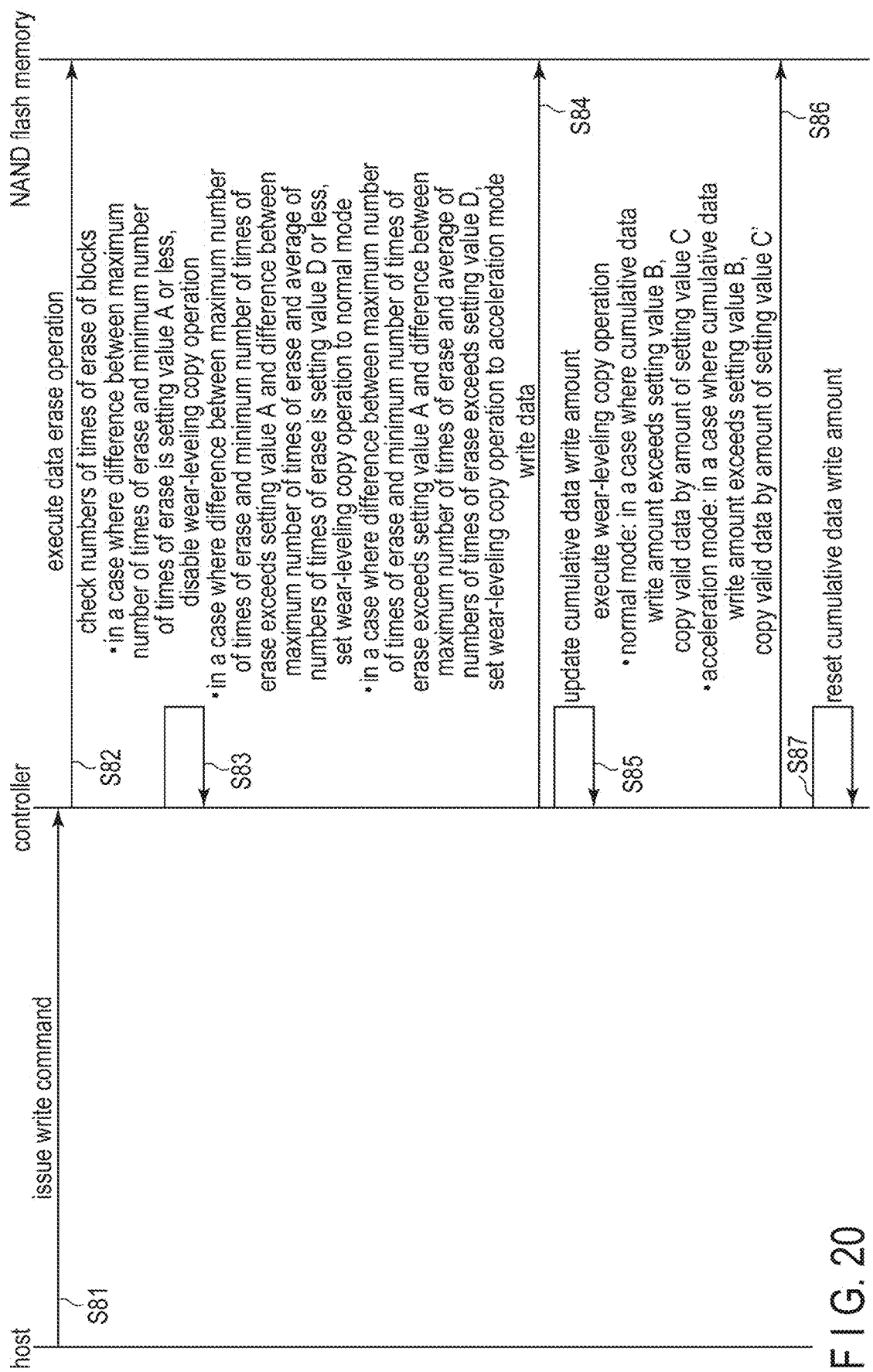
FIG. 20 is a sequence diagram illustrating a procedure of the wear-leveling copy operation executed in the memory system according to the fourth embodiment.

Next, a procedure of the wear-leveling copy operation in a case where the acceleration mode in the fourth embodiment is used will be described. FIG. 20 is a sequence diagram illustrating the procedure of the wear-leveling copy operation executed in the memory system according to the fourth embodiment.

In a process from S81 to S85, the process similar to the process from S61 to S65 described in FIG. 17 are executed.

In a case where the wear-leveling copy operation is enabled and the cumulative data write amount satisfies a condition, the controller 4 executes the wear-leveling copy operation on the NAND memory 5 (step S86). In a case where the wear-leveling copy operation is in the normal mode, the controller 4 determines whether or not the cumulative data write amount updated in S85 exceeds the setting value B. In a case where the cumulative data write amount exceeds the setting value B, the controller 4 executes the wear-leveling copy operation of copying valid data from a copy source block to a copy destination block by the amount of the setting value C. In addition, in a case where the wear-leveling copy operation is in the acceleration mode, similarly to the normal mode, the controller 4 determines whether or not the cumulative data write amount updated in S85 exceeds the setting value B. In a case where the cumulative data write amount exceeds the setting value B, the controller 4 executes the wear-leveling copy operation of copying valid data from a copy source block to a copy destination block by the amount of the setting value C'.

When the wear-leveling copy operation has been executed in S86, the controller 4 resets the cumulative data write amount to an initial value (for example, 0) (step S87).

Figure 21B:
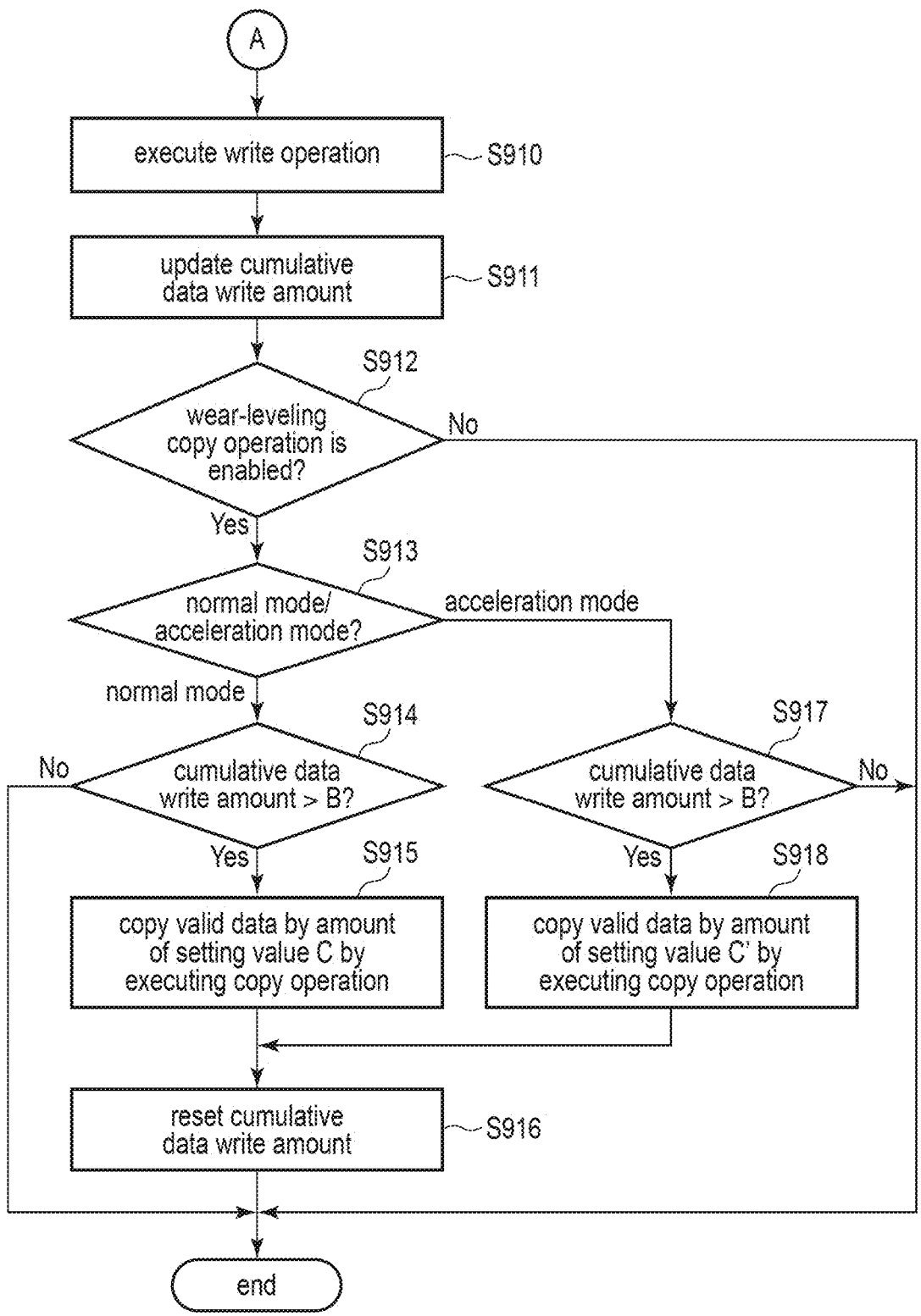
FIG. 21B is a flowchart illustrating another part of the procedure of the wear-leveling copy operation executed in the memory system according to the fourth embodiment.

Next, a procedure of the wear-leveling copy operation will be described. FIGS. 21A and 21B are flowcharts illustrating the procedure of the wear-leveling copy operation executed in the memory system according to the fourth embodiment.

In a process from S901 to S912, the process similar to the process from S701 to S712 described in FIGS. 18A and 18B are executed.

In a case where the wear-leveling copy operation is enabled (Yes in S912), the controller 4 determines whether the wear-leveling copy operation is in the normal mode or the acceleration mode (step S913).

In a case where the wear-leveling copy operation is in the normal mode (normal mode in S913), the controller 4 determines whether or not the cumulative data write amount exceeds the setting value B (step S914).

In a case where the cumulative data write amount exceeds the setting value B (Yes in S914), the controller 4 executes the copy operation of copying valid data from a copy source block to a copy destination block by the amount of the setting value C (step S915).

The controller 4 resets the cumulative data write amount to an initial value (step S916).

In addition, in a case where the cumulative data write amount is equal to or smaller than the setting value B (No in S914), the controller 4 skips S915 and S916 and ends the wear-leveling copy operation.

In a case where the wear-leveling copy operation is in the acceleration mode (acceleration mode in S913), the controller 4 determines whether or not the cumulative data write amount exceeds the setting value B (step S917).

In a case where the cumulative data write amount exceeds the setting value B (Yes in S917), the controller 4 executes the copy operation of copying valid data from the copy source block to the copy destination block by the amount of the setting value C' (step S918).

The controller 4 resets the cumulative data write amount to the initial value (step S916).

In addition, in a case where the cumulative data write amount is equal to or smaller than the setting value B (No in S917), the controller 4 skips S918 and S916 and ends the wear-leveling copy operation.

As described above, according to the fourth embodiment, when the wear-leveling copy operation is set to the acceleration mode and the cumulative data write amount exceeds the setting value B, the controller 4 executes the wear-leveling copy operation of copying data stored in the copy source block to the copy destination block by the amount of the setting value C'. The setting value C' is a value larger than the setting value C that corresponds to the amount of data copied from the copy source block to the copy destination block by one wear-leveling copy operation in the normal mode. Thus, while the wear-leveling copy operation is set in the acceleration mode, the amount of data written to the NAND memory 5 by the controller 4 by one wear-leveling copy operation is larger than in the normal mode. The threshold value of the cumulative data write amount related to the frequency at which the wear-leveling copy operation is executed is the setting value B in both the normal mode and the acceleration mode. Thus, in the acceleration mode, the ratio of the amount of data copied to the NAND memory 5 by the wear-leveling copy operation to the amount of data written to the NAND memory 5, based on a write command received from the host 2 is larger than in the normal mode.

Note that, the setting values used in the first to fourth embodiments are not limited to setting values set in advance. Each setting value may be changed as necessary.

While certain embodiments have been described, these embodiments have been presented by way of example only, and are not intended to limit the scope of the inventions. Indeed, the novel devices and methods described herein may be embodied in a variety of other forms; furthermore, various omissions, substitutions and changes in the form of the embodiments described herein may be made without departing from the spirit of the inventions. The accompanying claims and their equivalents are intended to cover such forms or modification as would fall within the scope and spirit of the inventions.

What is claimed is:

1. A memory system connectable to a host, comprising:
a nonvolatile memory that includes a plurality of blocks, each of which is a unit of a data erase operation; and
a controller that is electrically connected to the nonvolatile memory, wherein
at least a part of the plurality of blocks is able to store valid data,
the controller is configured to:
execute a copy operation of copying valid data stored in a first block among blocks that store valid data to a second block which does not store valid data and has a larger number of times of erase than the first block;
compare a first threshold value with a first difference between a first number of times of erase and a second number of times of erase among numbers of times of erase of the plurality of respective blocks, the second number of times of erase being larger than the first number of times of erase;
in a case where the first difference is larger than the first threshold value, compare the first difference with a second threshold value which is larger than the first threshold value;
in a case where the first difference is equal to or smaller than the second threshold value, execute the copy operation in a first mode; and
in a case where the first difference is larger than the second threshold value, execute the copy operation in a second mode,
a ratio of a copy amount to a cumulative data write amount in the first mode is smaller than a ratio of the copy amount to the cumulative data write amount in the second mode,
the cumulative data write amount is an amount of data written to the nonvolatile memory based on one or more write commands received from the host, and the copy amount is an amount of data copied to the nonvolatile memory by the copy operation.

2. The memory system according to claim 1, wherein the first number of times of erase is a minimum number of times of erase among the numbers of times of erase of the plurality of respective blocks, and
the second number of times of erase is a maximum number of times of erase among the numbers of times of erase of the plurality of respective blocks.

3. The memory system according to claim 1, wherein the controller is configured to, in the first mode:
in a case where the cumulative data write amount exceeds a third threshold value, execute the copy operation; and
after the copy operation is executed, reset the cumulative data write amount to an initial value, and
the controller is configured to, in the second mode:
in a case where the cumulative data write amount exceeds a fourth threshold value smaller than the third threshold value, execute the copy operation; and
after the copy operation is executed, reset the cumulative data write amount to the initial value.

4. The memory system according to claim 3, wherein the controller is configured to, in the first mode,
in a case where the cumulative data write amount exceeds the third threshold value, copy a first amount of data by executing the copy operation, and
the controller is configured to, in the second mode,
in a case where the cumulative data write amount exceeds the fourth threshold value, copy the first amount of data by executing the copy operation.

5. The memory system according to claim 1, wherein the controller is configured to, in the first mode:
in a case where the cumulative data write amount exceeds a third threshold value, copy a first amount of data by executing the copy operation; and
after the copy operation is executed, reset the cumulative data write amount, and
the controller is configured to, in the second mode:
in a case where the cumulative data write amount exceeds the third threshold value, copy a second amount of data larger than the first amount by executing the copy operation; and
after the copy operation is executed, reset the cumulative data write amount.

6. The memory system according to claim 1, wherein the controller is configured to execute, before the first difference is compared with the first threshold value, an erase operation on at least one block among the plurality of blocks that does not store valid data.

7. A memory system connectable to a host, comprising:
a nonvolatile memory that includes a plurality of blocks, each of which is a unit of a data erase operation; and
a controller that is electrically connected to the nonvolatile memory, wherein
at least a part of the plurality of blocks is able to store valid data,
the controller is configured to:
execute a copy operation of copying valid data stored in a first block among blocks that store valid data to a second block which does not store valid data and has a larger number of times of erase than the first block;
compare a first threshold value with a first difference between a first number of times of erase and a second number of times of erase among numbers of times of erase of the plurality of respective blocks, the second number of times of erase being larger than the first number of times of erase;
compare a fifth threshold value with a second difference between either a maximum number of times of erase or a minimum number of times of erase among the numbers of times of erase of the plurality of respective blocks and an average of the numbers of times of erase of the plurality of respective blocks;
in a case where the first difference is larger than the first threshold value and the second difference is equal to or smaller than the fifth threshold value, execute the copy operation in a first mode; and
in a case where the first difference is larger than the first threshold value and the second difference is larger than the fifth threshold value, execute the copy operation in a second mode,
a ratio of a copy amount to a cumulative data write amount in the first mode is smaller than a ratio of the copy amount to the cumulative data write amount in the second mode,
the cumulative data write amount is an amount of data written to the nonvolatile memory based on one or more write commands received from the host, and
the copy amount is an amount of data copied to the nonvolatile memory by the copy operation.

8. The memory system according to claim 7, wherein the first number of times of erase is the minimum number of times of erase among the numbers of times of erase of the plurality of respective blocks, and
the second number of times of erase is the maximum number of times of erase among the numbers of times of erase of the plurality of respective blocks.

9. The memory system according to claim 7, wherein the controller is configured to, in the first mode:
in a case where the cumulative data write amount exceeds a third threshold value, execute the copy operation; and
after the copy operation is executed, reset the cumulative data write amount, and
the controller is configured to, in the second mode:
in a case where the cumulative data write amount exceeds a fourth threshold value smaller than the third threshold value, execute the copy operation; and
after the copy operation is executed, reset the cumulative data write amount.

10. The memory system according to claim 9, wherein the controller is configured to, in the first mode,
in a case where the cumulative data write amount exceeds the third threshold value, copy a first amount of data by executing the copy operation, and
the controller is configured to, in the second mode,
in a case where the cumulative data write amount exceeds the fourth threshold value, copy the first amount of data by executing the copy operation.

11. The memory system according to claim 7, wherein the controller is configured to, in the first mode:
in a case where the cumulative data write amount exceeds a third threshold value, copy a first amount of data by executing the copy operation; and
after the copy operation is executed, reset the cumulative data write amount, and
the controller is configured to, in the second mode:
in a case where the cumulative data write amount exceeds the third threshold value, copy a second amount of data larger than the first amount by executing the copy operation; and
after the copy operation is executed, reset the cumulative data write amount.

12. The memory system according to claim 7, wherein the controller is configured to execute, before the first difference is compared with the first threshold value, an erase operation on at least one block among the plurality of blocks that does not store valid data.

* * * * *